US008953282B2

(12) United States Patent
Shiroishi et al.

(10) Patent No.: US 8,953,282 B2
(45) Date of Patent: Feb. 10, 2015

(54) MAGNETIC HEAD, AND MAGNETIC STORAGE APPARATUS

(71) Applicant: Hitachi, Ltd., Tokyo (JP)

(72) Inventors: Yoshihiro Shiroishi, Hachioji (JP); Katsuro Watanabe, Hitachiota (JP); Yo Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/960,270

(22) Filed: Aug. 6, 2013

(65) Prior Publication Data

US 2014/0063648 A1 Mar. 6, 2014

(30) Foreign Application Priority Data

Aug. 29, 2012 (JP) .................................. 2012-189082

(51) Int. Cl.
G11B 5/127 (2006.01)
G11B 15/18 (2006.01)
G11B 5/39 (2006.01)

(52) U.S. Cl.
CPC ............ *G11B 5/3909* (2013.01); *G11B 5/3945* (2013.01)
USPC .............................................. 360/110; 360/69

(58) Field of Classification Search
None
See application file for complete search history.

(56) References Cited

U.S. PATENT DOCUMENTS

| 7,616,412 | B2 | 11/2009 | Zhu et al. |
| 7,982,996 | B2* | 7/2011 | Smith et al. ..................... 360/59 |
| 8,085,490 | B2* | 12/2011 | Franca-Neto et al. ........... 360/75 |
| 8,295,009 | B2* | 10/2012 | Yamada et al. ............ 360/125.3 |
| 8,559,134 | B2* | 10/2013 | Yamada et al. ............ 360/125.3 |
| 8,643,972 | B2* | 2/2014 | Shiroishi et al. ................ 360/59 |
| 2008/0080100 | A1 | 4/2008 | Sato et al. |
| 2009/0052095 | A1 | 2/2009 | Yamada et al. |
| 2009/0246557 | A1 | 10/2009 | Horng et al. |
| 2011/0007431 | A1 | 1/2011 | Braganca et al. |
| 2011/0216436 | A1 | 9/2011 | Igarashi et al. |

FOREIGN PATENT DOCUMENTS

| JP | 2007-142746 A | 7/2007 |
| JP | 2009-70541 A | 4/2009 |
| JP | 2011-3869 A | 1/2011 |
| JP | 4799348 B2 | 10/2011 |
| JP | 4836553 B2 | 12/2011 |

* cited by examiner

Primary Examiner — K. Wong
(74) Attorney, Agent, or Firm — Mattingly & Malur, PC

(57) ABSTRACT

In a Spin Torque Oscillator (STO) comprising an underlayer, a first magnetic layer disposed on the underlayer, a non-magnetic intermediate layer disposed on the first magnetic layer, and a second magnetic layer disposed on the non-magnetic intermediate layer, the non-magnetic intermediate layer is a non-magnetic alloy containing 50 at % or more of at least one kind of element selected from a first group consisting of Cu, Ag, and Au, and further at least 0.1 at % or more in total of at least one kind of element selected from a second group consisting of Cu, Ag, Au, Cr, Ti, Zr, Hf, V, Nb, Ta, Ru, Os, Pd, Pt, Rh, and Ir that does not overlap with the element from the first group.

21 Claims, 16 Drawing Sheets

STO drive current

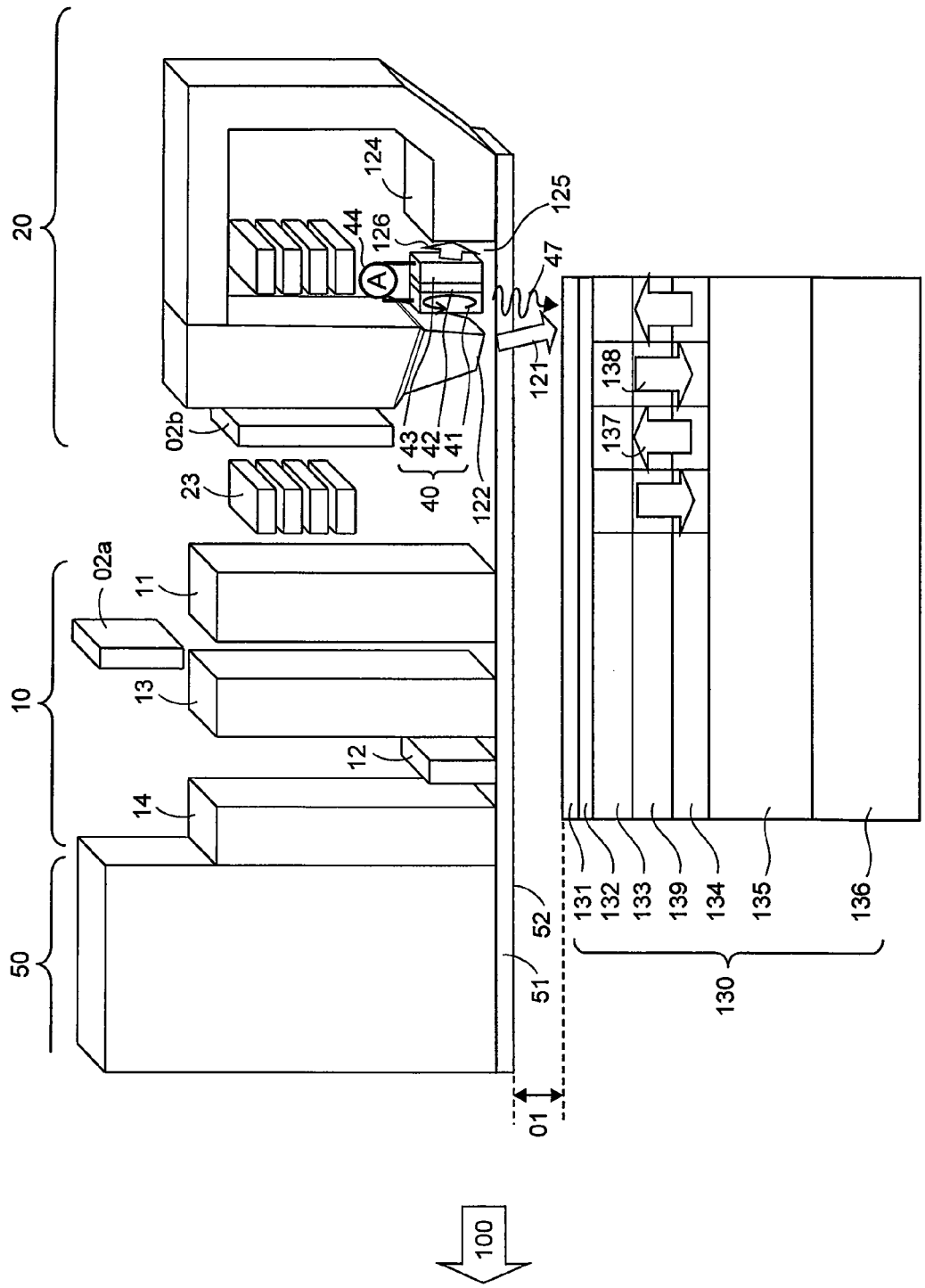

STO drive current

STO drive current

MAGNETIC HEAD, AND MAGNETIC STORAGE APPARATUS

CLAIM OF PRIORITY

The present application claims priority from Japanese patent application JP2012-189082 filed on Aug. 29, 2012, the content of which is hereby incorporated by reference into this application.

TECHNICAL FIELD

The present invention relates to an STO (Spin Torque Oscillator) sensor element and a microwave assisted magnetic recording head, both of which have high corrosion resistance and reliability during element energization, and a magnetic storage apparatus mounting the magnetic head.

BACKGROUND ART

With the evolution of the Internet environment and increases in data centers based on the widespread use of cloud computing and the like, the volume of generated information is rapidly increasing in recent years. It is safe to say that magnetic storage apparatuses, such as the hard disk drive (HDD) which offers the highest recording density and superior bit cost, will play a dominant role in the era of "Big Data" storage. Thus, it is necessary to increase the capacity of magnetic storage apparatus and achieve higher recording density to support the increase in storage capacity.

As a new magnetic recording technology for achieving higher recording density, the microwave assisted magnetic recording (MAMR) system has been proposed whereby magnetic recording in a perpendicular magnetic recording medium having high magnetic anisotropy is performed by applying a microwave-band high frequency magnetic field to the magnetic recording medium to excite precession of the medium magnetization, thus lowering the switching field. In recent years, a practical spin torque type high frequency oscillating element (Spin Torque Oscillator: STO) having a microstructure has been proposed, such as disclosed in Patent Document 1. The spin torque oscillator, to which spintronics technology is applied, generates a high frequency magnetic field by causing a high-speed rotation of spin in a high frequency magnetic field generation layer (Field Generation Layer: FGL) by the spin torque of spin injected from a spin injection layer driven by a direct-current power supply. The spin injection layer and the FGL are stacked via, for example, an electrically conductive intermediate layer of noble metal, such as Cu, Pt, Au, Ag, Pd, and Ru, or non-magnetic transition metal, such as Cr, Rh, Mo, or W (Patent Document 2). Patent Document 3 discloses a spintronics element for microwave assisted recording in which, as an underlayer for the spin injection layer of a [Co/Ni] magnetic super-lattice in which Co and Ni layers with film thicknesses on the order of several atomic layers are stacked on a substrate such that the thickness of the Ni layer is greater than the thickness of the Co layer, a composite seed layer including a lower Ta layer and a metal layer formed thereon having a fcc [111] crystalline structure or a hcp [001] crystalline structure is used.

Further, Patent Document 4 discloses a method for more efficiency inducing magnetization reversal by causing a high frequency magnetic field oscillating element to generate a high frequency magnetic field (circularly polarized magnetic field) that rotates in the same direction as the precession direction of magnetization of the magnetic recording medium in which magnetization reversal is desired, in accordance with the polarity of the recording field. Thus, research and development for practical application of the microwave assisted magnetic recording system is gaining momentum.

For the read element too, an STO sensor has been proposed whereby, based on the phenomenon in which the oscillation frequency due to spin torque effect varies depending on the magnitude of an external magnetic field, the recording magnetization state from the magnetic recording medium is detected by detecting a frequency change while the decrease in S/N due to magnetic thermal fluctuation noise caused by miniaturization is lowered. For example, Patent Document 5 proposes, in an STO sensor including a high frequency oscillating element and a second oscillating element disposed in the vicinity thereof that oscillates at a frequency close to the oscillation frequency of the high frequency oscillating element for locking the oscillation, a read element that acquires a high frequency oscillation signal generated across the ends of the high frequency oscillating element and the second oscillating element when energized perpendicularly to the film plane of the high frequency oscillation layer. Patent Document 6 proposes an STO sensor in which a magnetization free layer (free layer) is stacked via a non-magnetic layer. Patent Document 7 proposes an STO sensor in which two layers of magnetic films having longitudinal magnetic easy axes which are perpendicular to each other are stacked via a non-magnetic intermediate layer.

PRIOR ART DOCUMENT

Patent Documents

Patent Document 1: U.S. Pat. No. 7,616,412 B2
Patent Document 2: JP 2009-70541 A
Patent Document 3: JP 2011-3869 A
Patent Document 4: US 2011/0216436 A1
Patent Document 5: JP 4799348 B
Patent Document 6: JP 4836553 B
Patent Document 7: US 2011/0007431 A1

SUMMARY OF THE INVENTION

Problem to be Solved by the Invention

In the current perpendicular magnetic recording systems, with a view to achieving higher recording density and capacity, the anisotropy energy and coercive force of the perpendicular magnetic recording medium are being increased, and the recording field strength of a main pole-shield type magnetic head capable of recording the medium are being improved. However, as the recording density approaches 500 kTPI and 1 Tb/in$^2$, the current systems hit a practical limit in implementing narrow-track high-density magnetic recording.

Thus, in order to overcome the problem, the present inventors rigorously studied the structure and constituent materials of a microwave assisted magnetic recording head which is considered the prospective next-generation magnetic recording head, and magnetic head manufacturing processes. As a result, it has become clear that it is preferable to use, for the spin injection layer and the high frequency magnetic field generation layer, a magnetic super-lattice of a Co-based magnetic material having high crystal lattice axial symmetry and capable of easy high-speed magnetization rotation, or a Co-based Heusler alloy which is a half metal having high spin polarizability and the Curie temperature of not less than room temperature. Particularly, in the in-gap type STO in which the STO is disposed in the gap of the recording pole, it is desirable to have the magnetizations of the spin injection layer and high frequency magnetic field generation layer reversed by the recording field in the gap on the order of 10 kOe. It has been learned that the above Co-based magnetic material is particularly preferable as it can provide magnetic characteristics and coercive force suitable for the above purpose.

Thus, STOs and microwave assisted magnetic recording heads were actually fabricated by way of trial by using a [Co/Ni] magnetic super-lattice including Co and Ni and a Co-based Heusler alloy, and an electrically conductive intermediate layer of a noble metal described in Patent Document 2, such as Cu, Pt, Au, Ag, Pd, and Ru, or a non-magnetic transition metal such as Cr, Rh, Mo, and W, and their characteristics were comprehensively evaluated. Here, [A/B] denotes a magnetic super-lattice of A and B. As a result, it has become clear that, although the oscillation efficiency of the STO is high and good microwave assist performance can be obtained when Cu or Ag is used as the non-magnetic intermediate layer material, the magnetic head is easily corroded and reliability is lowered by electromigration as the STO is driven over time by energization with a high current density on the order of $10^8$ to $10^9$ A/cm$^2$, which is required for driving the STO. On the other hand, in the case of Au with high spin transmissivity, noble metals such as Pt, Pd, and Ru, and non-magnetic transition metals such as Cr, Rh, Mo, and W, it has become clear that although the characteristics are greatly improved in terms of corrosion resistance, the oscillation efficiency and microwave assist effect of the STO are low, and particularly in the case of noble metals, electric current energization reliability is low as in the case of Cu and Ag. Similar problems have also been identified with regard to the underlayer and the cap layer.

Generally, new elements are often added for characteristics improvements. However, in conventional technologies such as the GMR (Giant Magneto-Resistive) head, despite that the structure is substantially identical to that of the STO and energization involves the same order of high current density, i.e., $10^8$ to $10^9$ A/cm$^2$, a relatively simple structure of two layers of magnetic films stacked via a Cu intermediate layer has been used. This is due to the fact that (1) the magnetic layer is a NiFe thin film and the like and, compared with the present invention that attempts to use a magnetic super-lattice or a Co-based Heusler alloy, has inherently high tolerance to electromigration; and (2) because in a spintronics element that utilizes the spin scattering phenomenon at the interface between a magnetic layer and an electrically conductive intermediate layer, such as the GMR effect, defects or the scattering of spin electrons could be encouraged by the addition of an element, which may lead to deterioration in read characteristics but no improvements thereof, and therefore hardly any consideration has been devoted to the addition of an element to the intermediate layer so as to make it an alloy for improvement.

However, in the STO, it is necessary to fully utilize materials that are not yet to be used for practical applications, such as magnetic super-lattices and Co-based Heusler alloys. Thus, the present inventors chose to study the alloying of the intermediate layer in connection with the present invention. Initially, the cause for the dependency of the STO oscillation efficiency and the microwave assisted head characteristics on the intermediate layer material or the underlayer was investigated.

First, regarding magnetic characteristics, a systematic study of the effect of the underlayer in the case of a Co-based alloy thin film was conducted, taking CoCr for example. FIG. 1 shows the results. Namely, when a perpendicular magnetic CoCr alloy thin film whose composition has been optimized is formed on a glass substrate via an underlayer of Ti with the addition of Cr, the perpendicular orientation degree of the CoCr film is greatly improved (longitudinal squareness is lowered) with the Cr added amount of about 20 at %. As more Cr is added to the underlayer, the longitudinal orientation degree is increased (longitudinal squareness is increased) and reaches a maximum at approximately 80 at %. In order to clarify the cause for this, the structure of the TiCr alloy thin film and the CoCr thin film was examined by X-ray diffraction, transmission electron microscope, and the like. As a result, it has been confirmed that, while Ti has a hexagonal (hcp) crystalline structure as in Co or CoCr alloys, the metal atomic radius is larger than that of Co or CoCr, and the lattice matching with Co or CoCr alloys is low, so that a CoCr thin film cannot be easily heteroepitaxially grown on a Ti thin film with c-axis orientation. Thus, on the Ti thin film, the c-axis of CoCr is not neatly heteroepitaxially grown and a lattice defect is also caused, whereby the crystallinity and perpendicular orientation of the CoCr crystalline grains are degraded, and their longitudinal residual magnetization Mr is increased. However, when Cr, which is not easily dissolved in Ti and which has a small metal atomic radius, is added, only the TiCr crystalline grains with good c-axis orientation are grown, and their lattice constant is also decreased, and thus CoCr can heteroepitaxially grow at the Cr composition of around 20 at % at which the lattice constant is equal to the lattice constant of CoCr (high lattice matching) and the perpendicular orientation is improved, so that the longitudinal residual magnetization Mr is minimized. Meanwhile, it has been confirmed that when 20 at % of Ti is added to Cr, the longitudinal orientation of the crystalline grain of the CrTi alloy underlayer film is improved, and also the lattice constant matching with CoCr is increased, whereby CoCr can be more easily longitudinally oriented and the longitudinal residual magnetization Mr is maximized.

A similar study was also conducted for the magnetic super-lattice which is a stacked body of a Co-based alloy ultrathin magnetic film of atomic layer level and an ultrathin intermediate layer. As a result, it has been confirmed that by decreasing the film thickness of the magnetic thin film to the order of several atomic layers, the Co-based alloy thin film is fcc-orientated and its lattice spacing (lattice strain) becomes more readily changeable, and when aligned with the crystal lattice of the underlayer film and the interatomic spacing becomes greater than 0.38 nm, perpendicular magnetic anisotropy appears at the interface with the intermediate layer, so that as the interatomic spacing is increased, the perpendicular magnetic anisotropy of the Co-based magnetic film as a whole is increased. Conversely, when the interatomic spacing became smaller than 0.38 nm, longitudinal magnetic anisotropy appeared in the interface.

Thus, it has been found that even when the composition of the magnetic layer is optimized, the Co-based magnetic alloy material tends to have its crystalline growth and crystallographic orientation easily disturbed and has the increased likelihood of a lattice defect, and, in addition, the magnetic anisotropy and magnetic characteristics are degraded and the magnetic characteristics required for microwave oscillation according to design cannot be obtained, if the lattice constant matching with the underlayer material or intermediate layer is low. Namely, it has become clear that ensuring the matching of lattice constants is an extremely important issue.

The issue of matching of lattice constants of the above metal elements, as described with reference to FIG. 1, can be addressed by adding a second element having a different lattice constant in consideration of its crystalline structure and solid solubility, and it is believed that by thus carefully selecting the added element, the magnetic characteristics and corrosion resistance can be improved. Meanwhile, with regard to the efficiency of spin injection into the STO that influences the STO oscillation efficiency, and electric characteristics such as STO electric current energization reliability, degradation of high frequency oscillation output or frequency as a result of alloying may become a cause for concern, as described above. Thus, according to the present invention, spin scattering length and electromigration resistance are adjusted for the STO as a whole through improvements in film quality and crystallinity via improvements in lattice matching with the magnetic film, and the resultant improvements in electric characteristics and the simultaneous improvements in the performance of the underlayer and cap layer.

An object of the present invention is to realize high lattice matching, corrosion resistance, electric current energization reliability, appropriate spin scattering length, and high spin injection efficiency and to achieve increased high frequency oscillation efficiency in an STO, by adding a new element into the non-magnetic intermediate layer, the underlayer film, and the cap layer materials and thereby alloying them. In this way, a microwave assisted magnetic recording head that can generate strong high frequency magnetic field with high reliability can be provided, and further a high-capacity magnetic storage apparatus having high recording density based on the use of the same head can be provided with high manufacturing yield.

Means for Solving the Problem

According to the present invention, the non-magnetic intermediate layer disposed between the spin injection layer and the high frequency magnetic field generation layer of the STO is formed by a non-magnetic alloy containing 50 at % or more of at least one element selected from a first group consisting of Cu, Ag, and Au. Further preferably, the non-magnetic intermediate layer contains at least 0.1 at % or more in total of at least one kind of element selected from a second group consisting of Cu, Ag, Au, Cr, Ti, Zr, Hf, V, Nb, Ta, Ru, Os, Pd, Pt, Rh, and Ir that does not overlap with the element from the first group. The non-magnetic intermediate layer, the spin injection layer, and the high frequency magnetic field generation layer have a lattice constant mismatch of not more than 4% and more desirably not more than 1.5%.

The underlayer of the STO may be formed by an alloy containing 50 at % or more of at least one element selected from the second group, and at least 0.1 at % or more of at least one element that does not overlap therewith. The underlayer and the magnetic layer adjacent to the underlayer may have a lattice constant mismatch of not more than 4%.

The above conditions may be applied to the STO used as a magnetic read element.

Effects of the Invention

The present invention can provide an STO element that can provide high reliability with high oscillation efficiency even when placed under a high-current density and corrosive environment for a long time, a microwave assisted magnetic recording/reproducing head with excellent read/write characteristics, and a high-capacity and high-reliability magnetic storage apparatus that can perform excellent recording and reading even on a perpendicular magnetic perpendicular magnetic recording medium having high coercive force, with high reliability and manufacturing yield.

Other problems, configurations, means, and effects will become apparent from the following description of the embodiments.

BRIEF DESCRIPTION OF DRAWINGS

FIG. 13 is a conceptual diagram illustrating an example of the microwave assisted magnetic recording head and the perpendicular magnetic recording medium.

MODE FOR CARRYING OUT THE INVENTION

In the following, embodiments of the present invention will be described with reference to the drawings.

First Embodiment

Microwave Assisted Magnetic Recording/Reproducing Head

Figure 2:
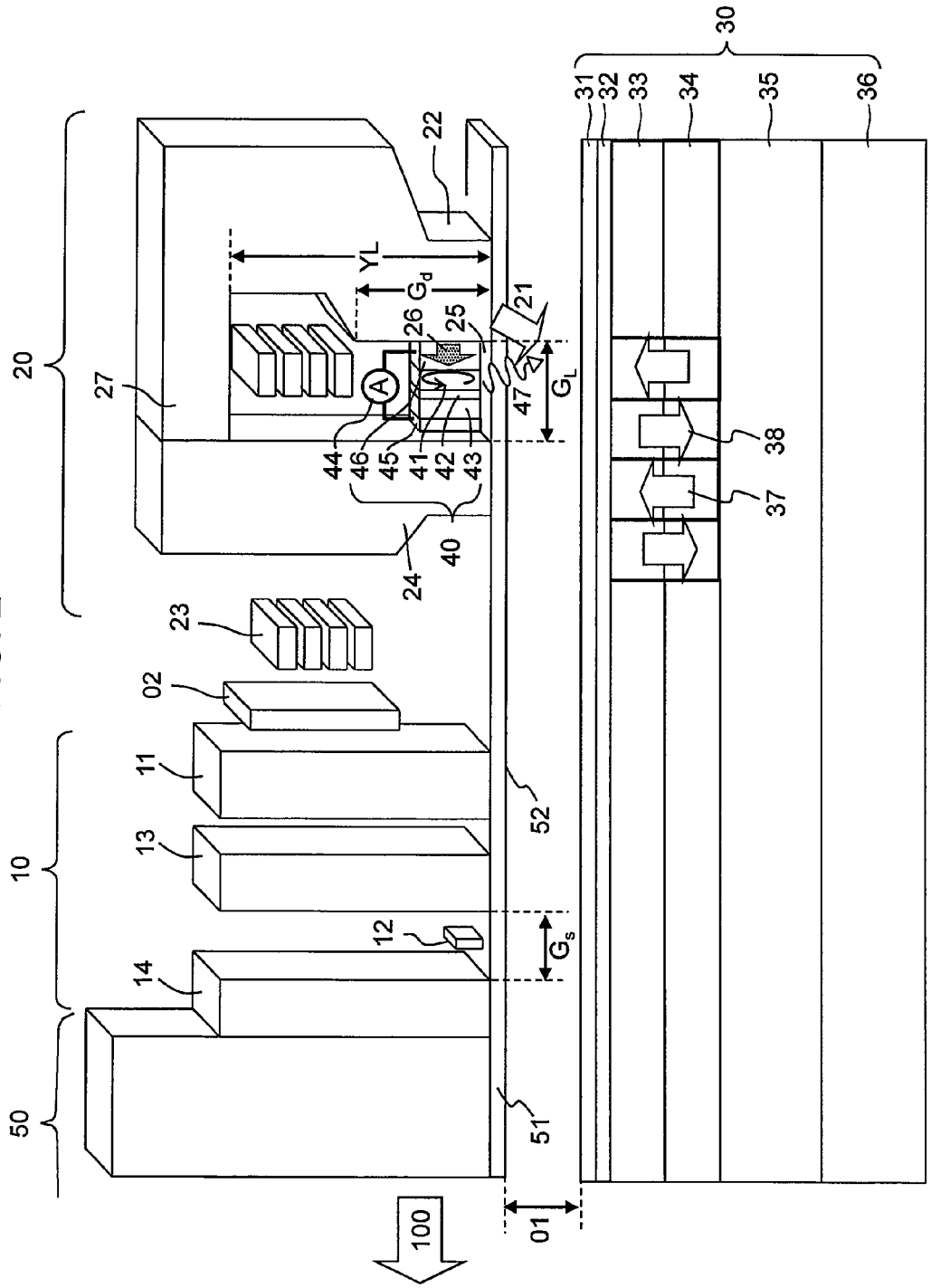
FIG. 2 is a conceptual diagram illustrating an example of a microwave assisted magnetic recording head and a perpendicular magnetic recording medium.

As shown in FIG. 2, a microwave assisted magnetic recording/reproducing head according to the present embodiment includes a read head portion 10, a recording head portion 20, and a thermally expandable element portion for clearance control (TFC: Thermal Flying Height Controller) 02, which are formed on a slider 50 that travels over a perpendicular magnetic recording medium 30 via a clearance 01 in the direction of an arrow 100.

The slider 50 is made of $Al_2O_3$—TiC ceramics and the like and is etched such that a negative pressure is produced on its ABS plane so that the amount of floating of the magnetic head pole portion is on the order of 5 to 10 nm throughout the circumference of the magnetic recording medium. The slider 50 is mounted on a suspension having element driving wires and build inside a magnetic storage apparatus as a HGA (Head Gimbal Assembly). While according to the present embodiment the slider is of a femto type measuring approximately 0.85 mm×0.7 mm×0.23 mm, the slider may be of a thin-femto type with the height of approximately 0.2 mm or a long-femto type with the length of approximately 1 mm, depending on the application. While the present embodiment is configured such that the magnetic recording medium 30 is relatively moved in the direction with the read head portion 10 of the magnetic recording/reproducing head on the leading side and the recording head portion 20 on the trailing side, the opposite configuration may be adopted.

The TFC 02 for clearance control is made of a high specific-resistance, high thermal-expansion material, such as NiCr or W, and includes a heating resistor thin film of the order of 50 to 150Ω insulated with an aluminum oxide thin film and the like. The TFC 02 is used for adjusting the clearance between the recording head portion 20 and read head portion 10 and the perpendicular magnetic recording medium 30 to the order of 0.5 to 2 nm. The TFC may be provided at two or more locations, in which case the respective wire connections may be either independent or in series. The wires for the input of feeding electric power are omitted. A head protection layer 51 is made of CVDC (Chemical Vapor Deposition Carbon), FCAC (Filtered Cathodic Arc Carbon), or the like, with a bottom surface 52 providing the floating surface of the magnetic head (Air Baring Surface: ABS). The head protection layer 51 may be omitted.

(Recording Head Portion)

The recording head portion 20 includes a high frequency magnetic field oscillating element portion (STO) 40 disposed in a recording gap 25; first and second recording poles 22 and 24 with greater widths than the STO for generating a recording field 21 and a strong and uniform STO oscillation control field 26 (hereafter "oscillation control field") in the recording gap portion 25; a coil 23 for magnetizing the recording poles; and an STO driving power supply 44. The first and second recording poles 22 and 24 have a magnetically substantially symmetrical ring type structure with an increased volume in the vicinity of the recording gap portion 25. The rotation direction, oscillation frequency, and the like of a high frequency magnetic field 47 of the STO are controlled by the oscillation control field 26. In the present ring type magnetic pole structure, the STO driving magnetic field enters the STO film plane uniformly and perpendicularly, so that the magnetization of the high frequency magnetic field generation layer (FGL) is rotated in an ideal state and smoothly. Compared with a conventional main pole-shield type magnetic pole structure, a high frequency oscillation magnetic field which is 10 to 20% stronger can be stably obtained, which is particularly preferable. According to the present structure, because the recording field is concentrated in the recording gap portion, magnetic recording is determined by the recording gap and, when the perpendicular magnetic recording medium is recordable, the recording mark (foot print) upon static recording therein substantially reflects the shape of the recording gap. While the coil 23 is formed around the second recording pole 24 by using a Cu thin film and the like in the illustrated example, the coil 23 may be formed around a rear end portion 27 of the recording pole or the first recording pole 22. Further, the coil may be in the form of a multilayered winding. The recording gap 25 is formed by a non-magnetic thin film, such as an $Al_2O_3$ or $Al_2O_3$—$SiO_2$ film, which is formed by sputtering or CVD process.

A recording gap length $G_L$ was determined in consideration of the thickness of the STO 40, the uniformity of the STO oscillation control field 26 in the recording gap, the strength and recording field gradient of the recording field 21, track width, gap depth $G_d$, and the like. The gap depth $G_d$ is preferably not less than the track width or gap length of the recording pole from the viewpoint of magnetic field uniformity. The track width of the first recording pole 22 on the trailing side (rearward of the head travel direction) was 40 to 250 nm, the gap depth was 40 to 700 nm, and the gap length was 20 to 200 nm. In order to ensure a uniform and strong magnetic field and the like in the recording gap, the magnetic layer film thickness of each magnetic pole in the vicinity of the gap portion was 40 nm to 3 µm. In order to increase frequency response, a smaller yoke length YL and a smaller number of coil windings are preferable. Thus, the yoke length was set to 0.5 to 10 µm, and the number of coil windings is set to 2 to 8. Particularly, in the magnetic head of a high-speed transfer compatible magnetic storage apparatus for server or enterprise purposes, for example, it is preferable to set the yoke length to be not more than 4 µm and, as needed, adopt a multilayer structure in which high saturation magnetic flux density magnetic thin films are stacked via a high-specific resistance magnetic or non-magnetic intermediate layer.

The first recording pole 22 was formed by a single layer or multiple layers of high saturation magnetic flux density soft magnetic films of FeCoNi, CoFe, a NiFe alloy, or the like by a thin film forming process, such as plating, sputtering, or ion beam deposition. The width $T_{WW}$ of the recording element is designed in accordance with the target recording field or recording density and obtained by semiconductor processing, and its size is on the order of 30 nm to 200 nm. As to the magnetic pole shape in the vicinity of the recording gap portion, a flat film structure which is parallel to the recording gap plane or a structure surrounding the STO may be adopted. In order to increase the recording field strength, it is particularly preferable to use a high saturation magnetic flux density material in the vicinity of the recording gap portion and shape it into a structure narrowing down toward the recording gap portion. The second recording pole 24 is also formed by a soft magnetic alloy thin film of a CoNiFe alloy or a NiFe alloy, as in the first recording pole 22, with a controlled shape.

(STO Structure)

The STO 40 includes a high frequency magnetic field generation layer (FGL) 41 made of a soft magnetic alloy such as CoFe or CoNiFe, a hard magnetic alloy such as CoPt or CoCr, a magnetic alloy having negative perpendicular magnetic anisotropy such as $Co_{0.6}Fe_{0.4}$, a Heusler alloy such as CoMnGe, or a magnetic super-lattice of [CoFe/Fe], [CoNi/NiFe], or the like; a non-magnetic alloy intermediate layer 42; a spin injection layer 43 for providing spin torque to the FGL; an underlayer 45; and a cap layer 46. While the STO driving power supply and electrode portions are schematically denoted by the sign 44, the recording poles 22 and 24 may be magnetically coupled but electrically insulated at a recording head rear end portion 27, for example, and each may be electrically connected to the STO sides in the gap portion, thus doubling the recording poles 22 and 24 as electrodes.

Except for special cases, the STO is supplied with a direct-current current from the driving power supply (voltage source or current source) 44 on the spin injection layer side so as to drive microwave oscillation of the FGL. While constant current drive is used in the illustrated example, constant voltage drive may be preferable to ensure reliability as it makes it possible to obtain constant current density.

(Non-Magnetic Intermediate Layer of STO)

As to the non-magnetic intermediate layer 42, it is preferable to optimize its material and composition so as to provide the STO with increased high frequency oscillation efficiency, corrosion resistance, and electromigration-resistant characteristics, and to set its film thickness on the order of 0.2 to 4 nm.

Regarding the material composition of the non-magnetic intermediate layer, the following study was conducted. Namely, first, on a target of Cu, Ag, Au, or an alloy thereof, pellets of Ti, Zr, Hf, V, Nb, Ta, Cr, Mo, W, Fe, Ru, Os, Ni, Pd, Pt, Co, Rh, Ir, Al, Ga, In, Zn, Si, Ge, Sn, B, Bi, Nd, C, Re and the like were placed while varying their effective areal ratio in a range of from 0 to 30%, and the pellets were formed by sputtering into an alloy thin film with the film thickness of 100 nm, which was then evaluated. The composition of the thin film was examined by emission spectrometry (Inductively Coupled Plasma (ICP) emission analysis) and the like using high frequency inductively coupled plasma as a light source.

The electric characteristics such as electric resistance were greatly degraded when given an additive of Si, Ge, B, Bi, Nd, or C. Sn, Zn, In, and Ga caused a great change in film structure upon energization with a high current density on the order of $10^9$ A/cm² which is required as an STO, and heating, which was not preferable. Accordingly, corrosion resistance was evaluated by quantitatively evaluating a change in reflectivity before and after the characteristics test as the corrosion degree for additives other than those mentioned above. The corrosion resistance test included a high-temperature/high-humidity test involving exposure in the atmosphere of temperature of 85° C. and humidity of 100% for three days, and a salt spray test at 0.1 mol % (for one day).

First, in order to control the lattice constant of Cu and Ag used as base materials, AgCu and CuAg alloy targets were fabricated with the composition of these added elements varied up to 40 at %. Then, on the alloy targets, metal pellets of Pd, Ti, Ta, Al, Co, Rh, Ir, Nb, Ru, Zr, Pt, Au, and V of 7 mm square with the thickness of 1 mm were placed while their effective areal ratio were adjusted, and alloy thin films containing these elements were formed by sputtering up.

Figure 3:
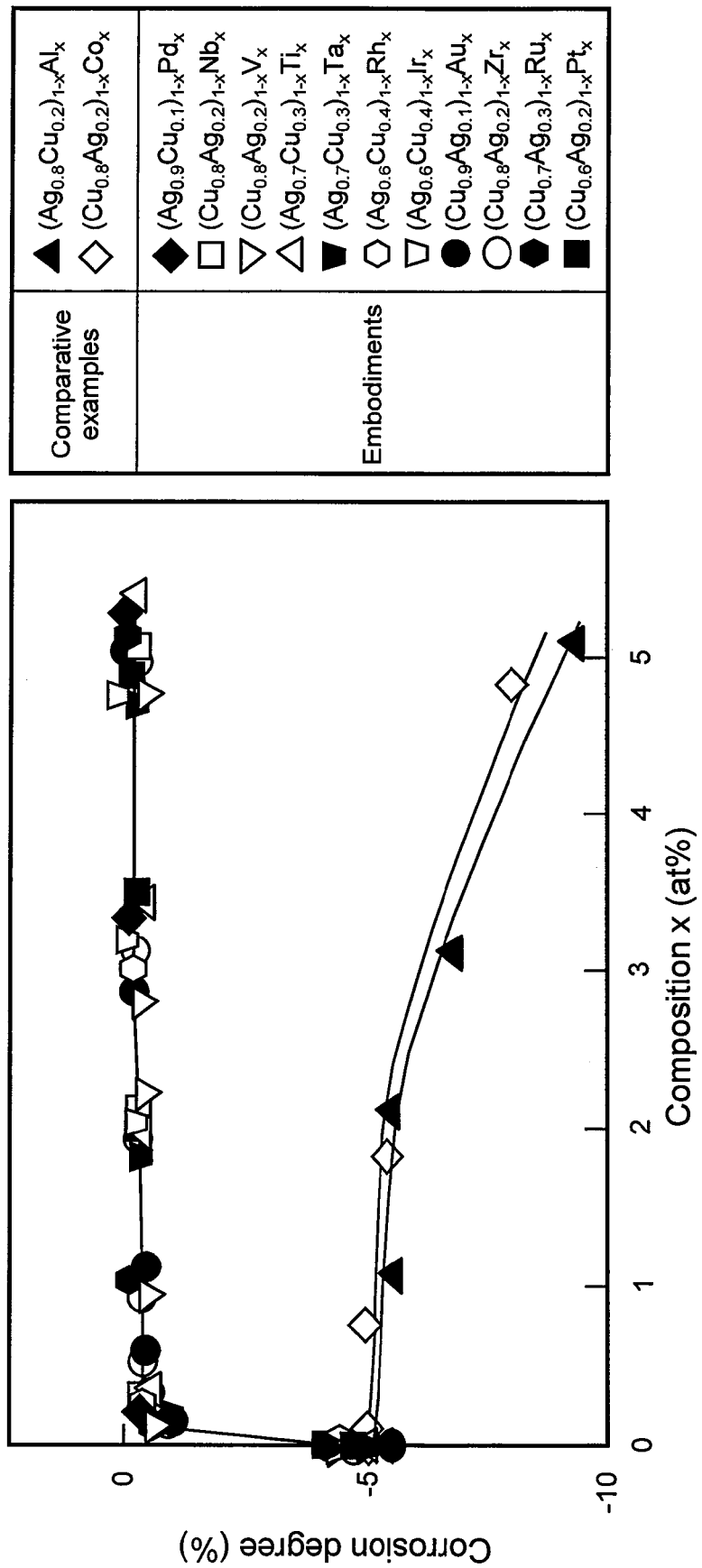
FIG. 3 illustrates the additive composition dependency of the corrosion resistance of a non-magnetic intermediate layer.

FIG. 3 illustrates the composition dependency of the corrosion resistance, in which the corrosion degree corresponds to the change in reflectivity and is used as a corrosion resistance indicator. It has been confirmed that when 0.1 at % or more of Pd, Ti, Ta, Rh, Ir, Nb, Ru, Zr, Pt, Au, and V, is contained, the corrosion resistance is improved with respect to the high-temperature/high-humidity test compared with comparative examples with the added Al and Co. Similarly, when alloy thin films were fabricated by using pellets of Cr, Hf, V, Nb, Ta, Mo, W, Fe, Os, and Pt, and their corrosion resistance was evaluated by the salt spray test, a significant corrosion resistance improvement effect was observed in the alloy thin films to which 0.1 at % or more of Cr, Hf, V, Nb, Ta, Os, and Pt was added. Similar effects were obtained when two or more kinds of the above elements were added in a total of 0.1 at % or more.

Similarly, the alloy thin films were subjected to the measurement of a change in resistivity at the time of energization to evaluate electromigration resistance, and further adhesion and mechanical strength were evaluated by a scratch test. As a result, the added elements for which an improving effect in electromigration and mechanical characteristics was observed when added in a total of 0.1 at % or more were Cr, Ti, Zr, Hf, V, Nb, Ta, Ru, Os, Pd, Pt, Rh, Ir, and Au, and it has been confirmed that in these alloy thin films, a superior corrosion resistance improving effect was obtained in both of the corrosion resistance tests, i.e., the high-temperature/high-humidity test and the salt spray test. However, when the added elements were added by more than 25 at %, the electron scattering length was decreased and the electric resistance became too high, so that it was preferable to set the added amount at not more than 10 at %. The same was true for Au as for Cu and Ag and their alloys. Namely, from the viewpoint of reliability in mechanical and electric characteristics, such as electromigration, it was effective to add to an element of a first group consisting of Cu, Ag, and Au at least one kind of element of Cr, Ti, Zr, Hf, V, Nb, Ta, Ru, Os, Pd, Pt, Rh, and Ir by 0.1 at % or more and 25 at % or less. As to the first group of elements, a similar corrosion resistance improving effect was observed in all of compositions of 0.1 at % or more when Au was added to Cu and Ag was added to Au.

Figure 4:
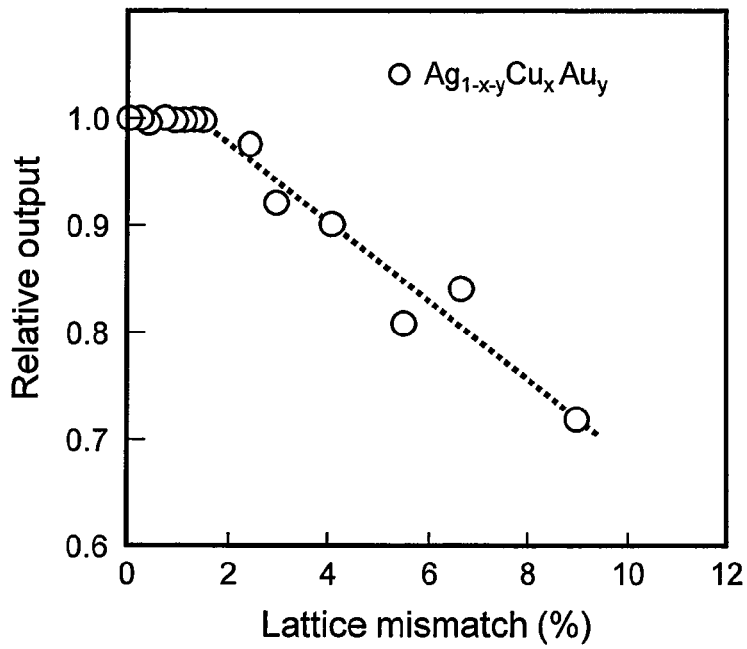
FIG. 4 illustrates the relationship between the microwave assist effect (relative output) and lattice mismatch.

Thus, next, the microwave assisted recording characteristics of the microwave assisted magnetic recording/reproducing head (as will be described in the latter half) mounting the STO formed with varying non-magnetic intermediate layer composition according to the present embodiment were evaluated. Namely, a microwave assisted recording head according to the second embodiment was fabricated by using an $Ag_{1-x}Cu_x$ alloy, an $Ag_{1-x-y}Cu_xAu_y$ alloy, a $Cu_{1-x}Au_x$ alloy, and a $Cu_{1-x}Ag_x$ alloy as the non-magnetic intermediate layer with respect to a $Co_2Fe(Ge_{0.5}Ga_{0.5})$ Heusler alloy thin film, and its characteristics were evaluated. A prototype magnetic head was fabricated while the compositions x and y of the added element were varied in a range of from 0.001 to 0.35 (0.1 to 35 at %). FIG. 4 shows a typical result in the case of the $Ag_{1-x}Cu_xAu_y$ alloy by way of example. It has been found that by making the lattice constant mismatch between the magnetic layer and the non-magnetic intermediate layer not more than 4% (in output, 90% or more of the maximum output), and more preferably not more than 1.5% (maximum output), a particularly good assist effect can be obtained even when considering variations. The difference in lattice constant was confirmed by an analysis using X-ray diffraction, an electron microscope, and the like.

Figure 1:
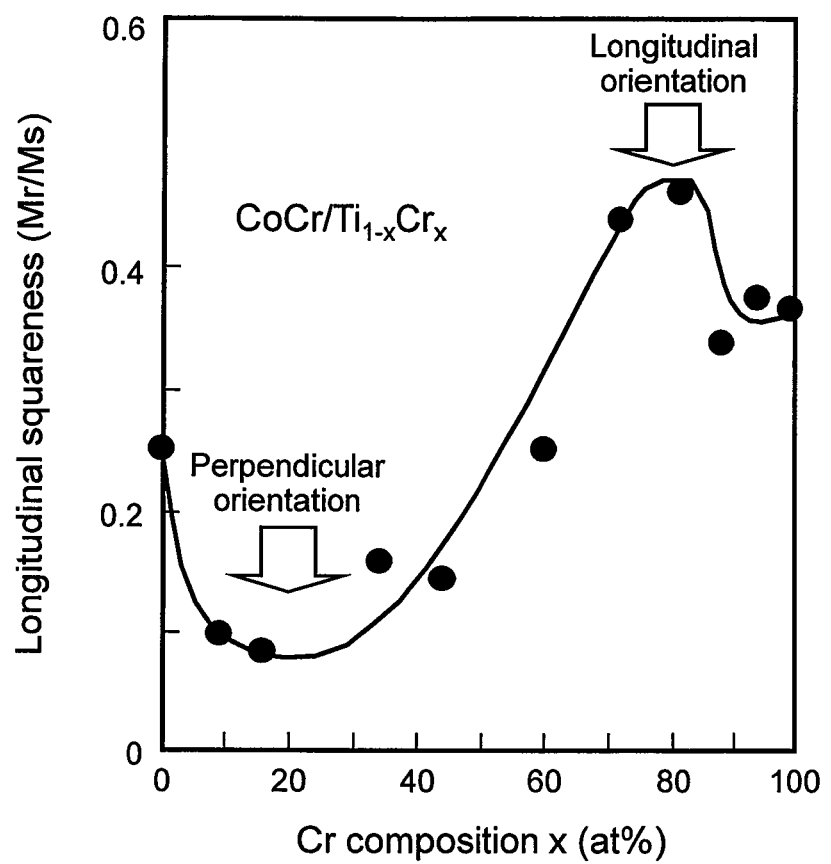
FIG. 1 illustrates the influence of a TiCr underlayer on a CoCr alloy thin film.

The above effect is due to the fact that, as shown in FIG. 1, the magnetic characteristics are improved by an increase in orientation and crystalline structure completeness of the magnetic layer. Also, while in a non-magnetic conductor of a simple substance metal from the first group, such as Cu, the electric resistivity ρ is small and approximately 1/10 that of the Co-based magnetic material, the spin scattering length λ, is large and approximately 100 times greater and the spin injection resistance λρ is large and approximately ten times that of the magnetic material so that an efficient spin injection cannot be performed, the spin scattering length is decreased by the above alloying and the spin injection resistance λρ becomes approximately the same as that of the magnetic material, resulting in an increase in spin injection effect. The present effect was observed in all of the above alloys in which corrosion resistance was ensured by adding, to an element from the first group consisting of Cu, Ag, and Au in the non-magnetic intermediate layer, an element from a second group consisting of Cu, Ag, Au, Cr, Ti, Zr, Hf, V, Nb, Ta, Ru, Os, Pd, Pt, Rh, and Ir that does not overlap with the first group element by 0.1 at % or more. In this case, too, it was preferable to set the added amount to be not more than 25 at %.

Figure 5:
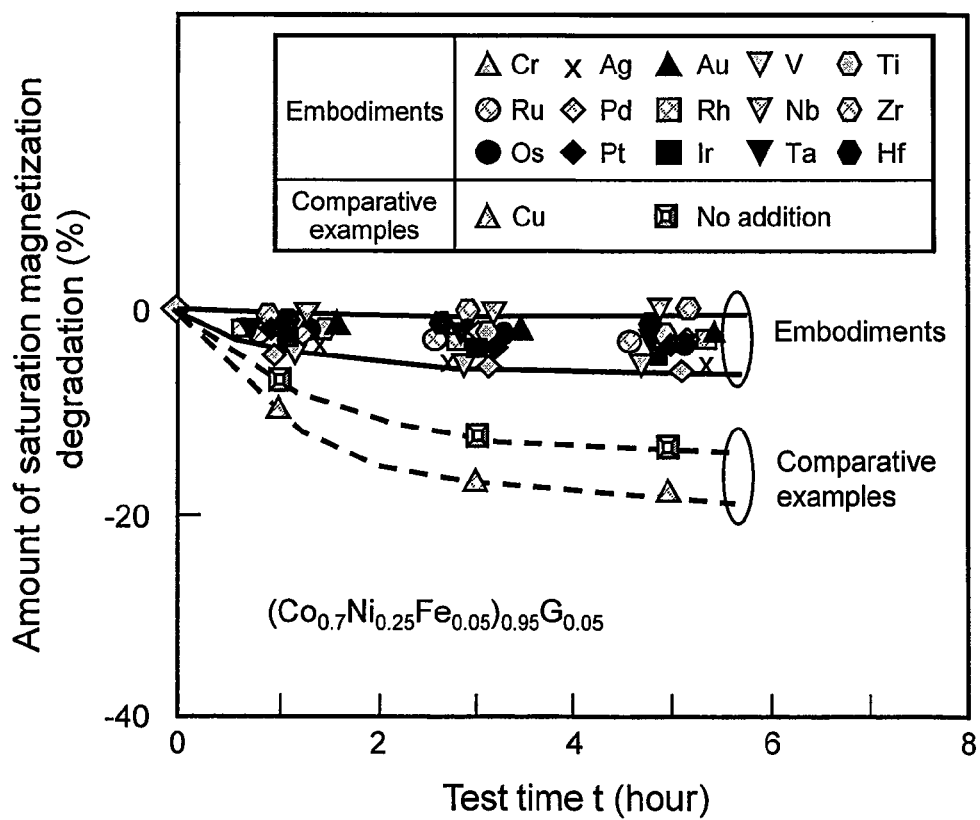
FIG. 5 illustrates the additive film composition dependency of the corrosion resistance of a magnetic thin film.
Figure 6:
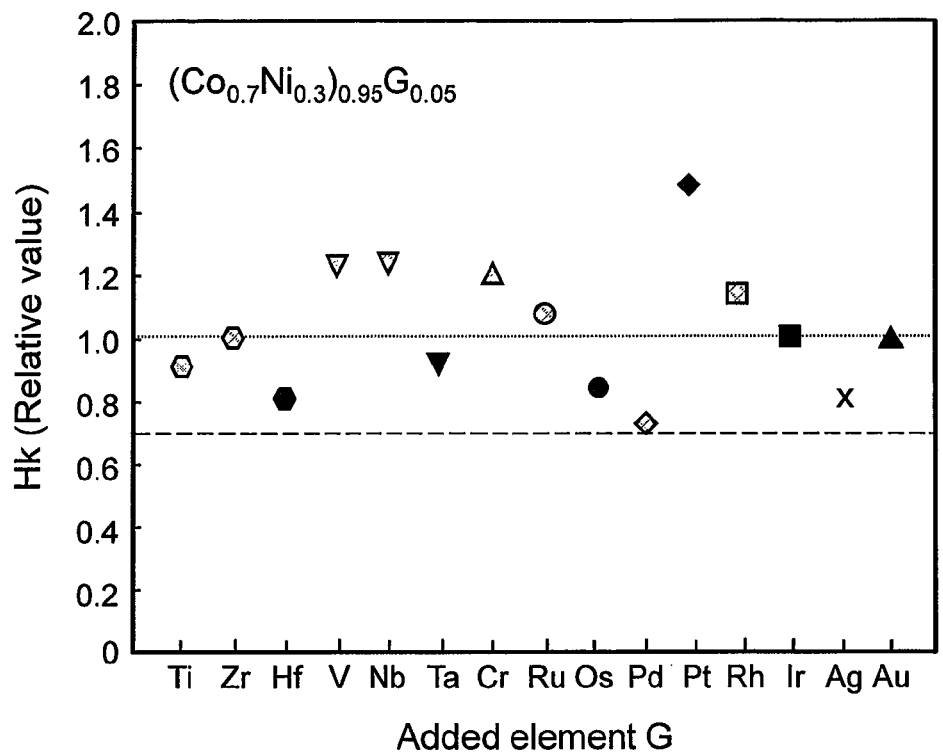
FIG. 6 illustrates the magnetic anisotropy field Hk of a Co-based alloy and the effect of an additive.

Further, a similar study was conducted for the magnetic materials for the spin injection layer and the high frequency magnetic field oscillation layer of the STO, namely, Co, Fe, Ni and Co-based alloys, an Fe-based alloy, a Ni-based alloy, and the like, and it has been confirmed that balanced improvements can be made in corrosion resistance, magnetic characteristics, and high frequency oscillation characteristics by adding an element from the second group except for Cu, i.e., an element from Ag, Au, Cr, Ti, Zr, Hf, V, Nb, Ta, Ru, Os, Pd, Pt, Rh, and Ir as described above. For example, the magnetic thin films of a CoNiFe alloy to which 5 at % of elements G was added was subjected to the accelerated spray test at 40° C. with 1 mol % saline water, and the amount of decrease in saturation magnetization due to corrosion was evaluated, and the result is shown in FIG. 5. Compared with the absence of addition and the addition of Cu by 5 at % according to the comparative examples, it has been confirmed that the magnetic thin film according to the present embodiment exhibits superior corrosion resistance. FIG. 6 shows relative changes in the magnetic anisotropy field Hk of the magnetic film before and after addition of the added element G. It has been confirmed that, in the magnetic thin film according to the present embodiment, 70% or more of the magnetic anisotropy field Hk of the magnetic film before addition can be ensured, and that the magnetic thin film is a preferable material for the STO. When V, Nb, Cr, Ru, Pt, or Rh is added, an improvement in the magnetic anisotropy field Hk was also observed, which was particularly preferable.

Similarly, with respect to the Ni-based alloy and the Fe-based alloy, the above effect was also observed when 0.1 at % or more in total of an element from the second group except for Cu was added. However, in each of the magnetic alloys of the Co-based alloy, the Ni-based alloy, and the Fe-based alloy, the saturation magnetization and magnetic anisotropy magnetic field were decreased when the added amount of the element was more than 15 at %, and they, including electric characteristics such as electric resistance, were further significantly degraded when the added amount was more than 25 at %. Thus, generally, it was not preferable to have the added amount exceeding 25 at %. From the above, it has been confirmed that comprehensive characteristics suitable for the magnetic material for the STO can be obtained with respect to its film structure, corrosion resistance, magnetic characteristics, and electric characteristics when the magnetic material has 50 at % of Co, Fe, or Ni or an alloy thereof and 0.1 at % or more in total and not more than 25 at % independently of at least one element selected from the second group except for Cu as an additive.

As will be described in detail later, similar material and composition analyses were conducted for the non-magnetic underlayer and the non-magnetic cap layer, and similar effects were confirmed. By forming the STO by using the above alloy materials, a superior microwave assist recording effect was obtained, as will be described in detail later.

(Target Material)

For the fabrication of the microwave assisted magnetic recording head, it was necessary to use the above materials as alloy targets. Thus, according to the present embodiment, alloy targets were manufactured by melting and casting process and by sintering.

Namely, at least 50 at % of an element from the first group consisting of Cu, Ag, and Au, and a total of 0.1 at % or more of at least one kind of element selected from the second group that does not overlap with the first group element were appropriately weighed, and the elements were dissolved and mixed in a high frequency melting furnace into an alloy. The alloy was cast in a casting mold and solidified into an ingot, which was subjected to processes including forging, rolling, and heating and then formed into a predetermined shape. A back plate was installed as needed, and the sputtering targets were prepared.

Film formation was performed by DC magnetron sputtering process using the alloy targets. Elements with greater atomic weight than the major elements were sputtered by the DC magnetron sputtering to have greater emission angles, i.e., to become more parallel with the target plane. Thus, in the composition of the film formed on a substrate installed facing the target, the ratio of the major elements was increased by approximately 1 to 2 at % compared with the target composition in terms of composition ratio. This ratio differed depending on the film forming conditions such as gas pressure and supplied electric power, and the element, and, in the case of lighter elements, the opposite tendency was observed. The oscillation efficiency of the STO strongly depends on the characteristics of the non-magnetic intermediate layer in particular. Thus, in order to obtain stable performance for mass production, it was preferable to appropriately adjust the composition of the target alloy for forming the non-magnetic alloy thin film having a predetermined composition relative to the composition of the non-magnetic alloy thin film.

(STO Configuration)

The STO 40 includes the high frequency magnetic field generation layer (FGL) 41 of a Co-based Heusler alloy, such as CoFeAlSi, CoFeGe, CoMnGe, CoFeAl, CoFeSi, or CoMnSi, or a magnetic super-lattice such as [CoFe/FeCo] or [CoFeGe/CoMnGe], as a magnetization free layer with freely rotating magnetization; the non-magnetic alloy intermediate layer 42 including at least one alloy layer containing at least 50 at % or more of at least one element selected from the first group consisting of Cu, Ag, and Au for controlling the lattice strain and magnetic anisotropy of the magnetic film by making the lattice constant mismatch with the magnetic layer to be not more than 4% and more preferably not more than 1.5%; and the spin injection layer 43 of a hard magnetic alloy such as a CoPt, CoCr, CoCrPt, or $L1_2$-$Co_3$Pt-based alloy, a $L1_2$-$(CoCr)_3$Pt-based alloy, a $L1_1$-$Co_{0.5}Pt_{0.5}$-based alloy, a m-$D0_{19}$-type $Co_{0.8}Pt_{0.2}$-based alloy, or $L1_0$-type FePt, or a hard magnetic super-lattice of [Co/Ir], [Co/Ni], [CoNiTa/Pd], or [Co/Pt], having a magnetic anisotropy axis in a perpendicular direction with respect to the film plane.

The spin injection layer 43 has the direction of its magnetization changed by the head magnetic field at the time of direct-current application, thus providing the FGL with spin torque at all times and functioning as a magnetization fixing layer (pin-layer) for stabilizing the oscillation of the FGL. A magnetic super-lattice film may be preferably used for the spin injection layer because the magnetic super-lattice film offers a high degree of freedom in designing magnetic characteristics. However, given the fact that elements such as Pt, Cr, Ir, and Pd are spin depolarizing materials as simple substance, and tend to suppress the function of a spintronics element, and in view of the desirability of providing appropriate magnetic characteristics, it is particularly preferable, as its configuration, to stack at least two layers of a magnetic alloy thin film containing at least 50% or more of Co and at least 0.1 at % or more in total of at least one element selected from the second additive group, i.e., Ag, Au, Cr, Ti, Zr, Hf, V, Nb, Ta, Ru, Os, Pd, Pt, Rh, and Ir, except for Cu, and, similarly, a magnetic alloy thin film containing at least 50 at % or more of at least one element selected from the group consisting of Fe and Ni and at least 0.1 at % or more in total of at least one element selected from the second additive group except for Cu.

Figure 7:
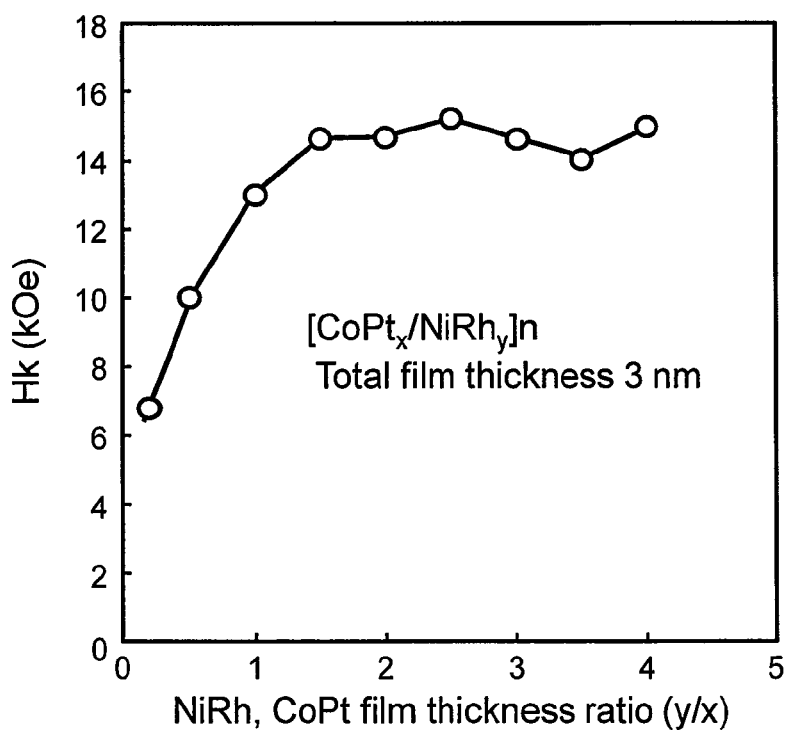
FIG. 7 illustrates the relationship between a Co-based alloy to Ni-based alloy film thickness ratio in a [Co-based alloy/Ni-based alloy] and the magnetic anisotropy field Hk.

For example, 5 at % of Pt and Rh was used as additives and two to 25 layers of films of a CoPt alloy and a NiRh alloy containing with film thicknesses of 0.2 nm, 0.4 nm, 0.6 nm, and 0.8 nm for each were formed on a glass substrate via Pt with the film thickness of 2 nm and a TiCr alloy layer with the film thickness of 2 nm, and their characteristics were evaluated by using an X-ray diffraction apparatus and a vibrating sample magnetometer (VSM). As a result, each had fcc(111) orientation, and the [CoPt/NiRh] magnetic super-lattice film was, as shown in FIG. 7, a perpendicular magnetization film with the magnetic anisotropy field Hk of 6.7 kOe or more. A particularly large magnetic anisotropy field Hk was obtained when the film thickness ratio of the Ni-based alloy magnetic layer and the Co-based alloy magnetic layer was more than one (the composition of the Ni-based alloy upon averaging is greater), where the magnetic anisotropy field Hk was 13 kOe or more. Thus, it has been confirmed that a preferable perpendicular magnetization film was obtained. While FIG. 7 shows the example with the film thickness of 3 nm, the result was the same when the film thickness was varied. While additives other than Pt and Rh, i.e., the above-mentioned Cr, Ti, Zr, Hf, V, Nb, Ta, Mo, W, Fe, Ru, Os, Ni, Pd, Co, Ir, Al, Ga, In, Zn, Si, Ge, Sn, B, Bi, Nd, C, and Re were also considered, it was preferable to add 0.1 at % or more in total and not more than 25 at % independently of at least one element selected from the second group except for Cu, from the viewpoint of magnetic characteristics such as saturation magnetization and perpendicular magnetic anisotropy, film structure, corrosion resistance, spin injection efficiency, and the like.

Considerations were also given to the case of using a simple substance metal, such as Ta, Cu, Ti, and Pt, as the underlayer film. However, when an alloy thin film of TiCr or PtTi alloy, for example, was used, the perpendicular magnetic anisotropy was preferably approximately 20% higher than in the comparative examples using the simple substance metal underlayers, as in the case of FIG. 1.

While the above is the effect obtained when the underlayer film was formed on a glass substrate and further the magnetic film was formed thereon, similarly stable magnetic performance and the like was obtained when, in a simulation of an actual head structure, a recording head magnetic pole thin film of FeCo, CoFe, or CoNiFe was formed on a glass substrate, and then the alloy underlayer and the magnetic super-lattice film were formed further thereon. This was more preferable than the simple substance metal underlayer films according to the comparative examples, in which orientation degradation on the order of several to 10% and characteristics degradation were observed.

The FGL 41 is formed by a soft magnetic alloy such as FeCo, CoNiFe, or NiFe (typical compositions will be described later); a hard magnetic alloy such as CoPt or CoCr; an Re-TM-type amorphous hard magnetic alloy such as TbFeCo; a Co-based magnetic alloy having a negative perpendicular magnetic anisotropy and an effective magnetic easy plane in the film plane, such as $Co_{0.6}Fe_{0.4}$, $Co_{0.99}Fe_{0.01}$, or $Co_{0.8}Ir_{0.2}$; a soft magnetic Co-based Heusler alloy such as CoFeAlSi, CoFeGe, CoMnGe, CoFeAl, CoFeSi, or CoMnSi; or a Co-based magnetic super-lattice having negative perpendicular magnetic anisotropy and an effective magnetic easy plane in the film plane, such as [Co/Fe], [$Co_{0.85}Fe_{0.15}$/$Fe_{0.7}Co_{0.3}$], [Co/Ir], or [CoFeGe/CoMnGe]. As to the film thickness, 1 to 100 nm is preferable because, although a greater thickness provides a higher high frequency magnetic field, too much thickness tends to disturb the magnetic domain structure and magnetization. It has been confirmed that by applying a strong STO control field 26 to the FGL, stable oscillation can be obtained in each of the soft magnetic material, the hard magnetic material, and the negative perpendicular magnetic anisotropy material, and particularly stable and preferable oscillation was obtained in the material having negative perpendicular magnetic anisotropy.

The width $W_{FGL}$ of the FGL, which may be designed and processed in accordance with the target recording field or recording density, was 5 nm to 50 nm. It is particularly preferable to make the height of the FGL greater than its width, as this facilitates the formation of a closed magnetic circuit of magnetic flux by the recording field from a deeper portion of the perpendicular magnetic recording medium and the element portion corresponding to the excess height, whereby the high frequency magnetic field component can be delivered to the deeper portion of the perpendicular magnetic recording medium and the assist effect can be enhanced. In the case of a combination with a shingled magnetic recording (SMR) system, as will be described later, it was preferable to set $W_{FGL}$ two to three times greater than the recording track width. When $W_{FGL}$ is thus increased, it is preferable to make the control field stronger.

In the foregoing, in order to stabilize the high frequency magnetization rotation of the FGL 41, a rotation guide ferromagnetic layer of a configuration similar to that of the spin injection layer 43 may be disposed adjacent to the FGL 41, or the order of stacking of the spin injection layer 43 and the FGL 41 may be reversed.

(STO Non-Magnetic Underlayer)

As to the non-magnetic underlayer 45, in order to control the film quality and film characteristics of the spin injection layer 43 and the high frequency magnetic field generation layer 41 and to increase oscillation efficiency, reliability, and energization efficiency, it is preferable to ensure a lattice matching with the magnetic layer of the STO, as in the non-magnetic intermediate layer 42. It is preferable to set the lattice constant mismatch with the magnetic layer and the non-magnetic alloy intermediate layer of the STO to be not more than 4% and more preferably not more than 1.5%.

As the underlayer material, Cu, Ag, and Au and the above-described Ti, Zr, Hf, V, Nb, Ta, Cr, Mo, W, Fe, Ru, Os, Ni, Pd, Pt, Co, Rh, Ir, Al, Ga, In, Zn, Si, Ge, Sn, B, Bi, Nd, C, and Re were studied. As a result, it has been confirmed that a single-layer or laminated thin film of elements from the second group are applicable. When the STO is formed on the recording pole of FeCo, CoFeNi, or the like as in the microwave assisted magnetic recording/reproducing head according to the present embodiment, the crystallographic orientation of the STO is readily degraded. Thus, among the characteristics required of the material of the non-magnetic alloy intermediate layer 42, it is important that the material has superior characteristics for enhancing the orientation of the STO film regardless of the substrate material. A significant improvement was preferably recognized when the material was a non-magnetic alloy thin film containing 50 at % or more of at least one element from the second additive group, such as TiCr, TaCr, CuNb, RuTi, PtCu, CuHf, or CrZr, and at least 0.1 at % or more of at least one element from the second group that does not overlap with the above, or a laminated thin film thereof, compared with when the non-magnetic intermediate layer was a simple substance element, as in FIG. 1. In the foregoing, it was preferable to set the added amount of the at least one element from the second group that does not overlap with the 50 at % or more of the major component to be not more than 25 at % because the amount exceeding 25 at % leads to greater degradation of the electric characteristics, such as electric resistance.

While a greater film thickness is preferable for the non-magnetic underlayer, an appropriate film thickness is set in consideration of the recording gap length. A good effect was obtained in a range of 1 to 15 nm.

(STO Non-Magnetic Cap Layer)

Meanwhile, as to the cap layer 46 provided as the uppermost layer of the STO, it is preferable to adopt a material and configuration such that a strong high frequency oscillation magnetic field can be obtained by suppressing damping constant, and high electric current energization reliability can be ensured by suppressing STO electromigration. Namely, when the recording poles double as electrodes as according to the present embodiment, it is preferable to increase their spin injection resistance so that the spin from the recording poles would not affect the magnetization rotation layer, and it is preferable to use a laminated film including at least one layer of material with long spin scattering length, such as Cu, Ag, and Au, or the above-described the non-magnetic intermediate layer material. Alternatively, a high melting-point metal with high electromigration-resistant characteristics, such as Nb, may be used for the cap layer, or a thin Ru that can lower the critical current density (Jc) by a strong spin scattering effect may be used for the cap layer. Also, in order to combine the above effects, a single-layer or laminated thin film from the second group may be applied, as in the non-magnetic underlayer. It was also comprehensively preferable to use a non-magnetic alloy thin film containing 50 at % or more of at least one of these elements and at least 0.1 at % or more of at least one element from the second additive group that does not overlap with the above, or a laminated thin film thereof, as in the underlayer. Also in the case of the cap layer, it was preferable to set the added amount of the at least one element from the second group that does not overlap with the 50 at % or more of the major component to be not more than 25 at % because the added amount exceeding 25 at % results in an increase in degradation of the electric characteristics, such as electric resistance.

While a greater film thickness is preferable for the non-magnetic cap layer, an appropriate film thickness is set in consideration of the recording gap length. A good effect was obtained in a range of from 1 to 15 nm.

(Read Head)

The read head portion 10 includes a magnetic shield layer 11 for shielding the read head portion from the recording field of the recording head, a read sensor element 12, and upper and lower magnetic shields 13 and 14 for increasing read resolution. An interval $G_s$ between the upper and lower magnetic shields 13 and 14 is the read gap length. The read element 12 has the role of reading a signal from the medium, and may be configured have the TMR (Tunneling Magneto-Resistive) effect, the CPP (Current Perpendicular to Plane)-GMR (Giant Magneto-Resistance) effect, or the EMR (Extraordinary Magneto-Resistive) effect. The read element 12 may be of a scissors type such as $Co_2Fe(Al_{0.5}Si_{0.5})/CuAu/Co_2Fe(Al_{0.5}Si_{0.5})$ or $Co_2Mn(Ge_{0.75}Ga_{0.25})/AgRh/Co_2Mn(Ge_{0.75}Ga_{0.25})$, in which Heusler alloy films having high spin polarizability, such as $Co_2MnGe$ or $Co_2FeAl$ are laminated via the non-magnetic alloy intermediate layer of Cu, Ag, or Au or containing them as a principal component, or of a differential type.

The non-magnetic alloy intermediate layer preferably is a non-magnetic alloy material containing at least 50 at % or more of at least one element selected from the first group consisting of Cu, Ag, and Au, and at least 0.1 at % or more in total of at least one kind of element selected from the second group that does not overlap with the above. In this way, the lattice constant mismatch with the magnetic layer can be made not more than 4% and more desirably not more than 1.5%, so that the band structure matching with the Heusler alloy can be increased, whereby a high magneto-resistance ratio and read sensitivity can be obtained and corrosion resistance can be ensured. In order to ensure good spin current conductivity, film crystallographic orientation, and the like, it was preferable to set the added amount to be not more than 25 at %.

In the case of a metal alloy intermediate layer, because the absolute value of its resistance is small, it is difficult to obtain a read output on the order of 1 mV in a current value range such that electric current energization reliability can be ensured, even if the magnetic resistance is greatly changed. Further, spin injection efficiency tends to be lowered by resistance mismatch of spin injection resistance with the intermediate layer, as described above. Thus, in order to ameliorate this, it was particularly preferable to stack a tunnel barrier layer of MgO, ZnO, GaO, $In_2O_3$, or the like on the above, or to sandwich the above between the tunnel barrier layers to form a non-magnetic intermediate layer.

(STO Sensor)

Further, for the read element 12, an STO sensor element based on the STO effect may be used. In the STO sensor element, as opposed to the STO recording element, the magneto-resistance change ratio (MR ratio), i.e., the output, was increased by setting the magnetization orientation state such that the relative angle between the magnetization of the spin injection layer stacked via the non-magnetic intermediate layer and the magnetization rotation layer can be greatly changed by magnetization rotation. Namely, by using the same magnetic material as the STO recording element, by longitudinally orientating the magnetic easy axis 79 of the spin injection layer 63, and further by making the magnetic easy axis of the magnetization rotation layer 41 perpendicular to the film plane, the magnetization 67 of the magnetization rotation layer was caused to rotate about an axis 68 perpendicular to the film plane (see FIG. 16), or the magnetic easy axis 68 of the spin injection layer 43 was oriented perpendicular to the film plane, and the magnetic easy axis of the magnetization rotation layer 61 was oriented in the film plane, whereby the magnetization 77 of the magnetization rotation layer was caused to rotate at high speed about a magnetic easy axis 78 in the film plane (see FIG. 15)

As the non-magnetic intermediate layer for the STO sensor, while a tunnel barrier layer of GaO, SrO, TiO, VO, or MgO or an alloy oxide and the like of two or more compounds selected therefrom may be used, an MgO thin film, a GaO thin film, and a (MgGa)O thin film were most appropriate. This is due to the fact that, by joining a magnetic thin film including CoFe, CoFeB, or the like with the above thin film via (001) plane, a spin filter effect due to band structure appears, whereby a large magneto-resistance effect can be obtained.

In the STO sensor, the read head 10 of FIG. 2 can be configured by energizing the STO sensor element by doubling the upper and lower shield layers 13 and 14 as electrodes, as in the STO recording element. In the read head of the present configuration, the magnetization information of the perpendicular magnetic recording medium can be detected with a very high S/N of 20 to 30 dB or more by calculating the recording magnetization state by a frequency modulation detection method, such as by processing a waveform multiplied with a one-bit-delayed high frequency oscillation waveform by a low-pass filter, taking advantage of the fact that the frequency of magnetization rotation of the STO sensor magnetization rotation layer is changed (modulated) in proportion to the leakage magnetic flux. The configuration of the present STO sensor can be simplified, as in the scissors type head. Thus, the read gap length $G_s$ (see FIG. 2) corresponding to the thickness of the STO sensor element including the underlayer and the cap layer can be set on the order of not more than 16 nm, whereby the leakage magnetic flux from the medium could be read with high resolution.

When the magnetic shield doubles as the electrodes, it is preferable to increase the spin injection resistance of the underlayer and the cap layer so as to prevent the spin injected from the magnetic shield material upon energization from influencing the magnetization rotation layer. According to the present embodiment, a material with a long spin scattering length compared with the magnetic material is used for the underlayer and the cap layer, as in the non-magnetic alloy intermediate layer, and disposed between the shield layer and the STO sensor element. The details will be described with reference to sixth and seventh embodiments below.

The element width, element height, and the shield interval of FIG. 2 (read gap length $G_s$) of the read sensor element are designed and processed in accordance with the target recording track density or recording density. For example, the element width was on the order of 5 nm to 50 nm. In FIG. 2, illustration of the read output drawing terminals is omitted.

(Perpendicular Magnetic Recording Medium)

The perpendicular magnetic recording medium 30 shown in FIG. 2 includes a super-smooth, heat-resistant non-magnetic substrate 36 of glass, Si, plastics, a NiP-plated Al alloy, or the like on which a soft magnetic underlayer 35, first and second magnetic layers 33 and 34, a protection layer 32, a lubricating layer 31 and the like are stacked. The soft magnetic underlayer 35 is FeCoTaZr or the like. The first and second magnetic layers 33 and 34 include CoCrPt, a $L1_2$-type $Co_3Pt$-based ordered alloy, an $L1_2$-type $(CoCr)_3Pt$-based ordered alloy, an $L1_1$-type $Co_{0.5}Pt_{0.5}$-based ordered alloy, an m-$D0_{19}$-type $Co_{0.8}Pt_{0.2}$-based ordered alloy, a magnetic super-lattice such as [CoCr—$SiO_2$/Pt] and [CoB/Pd], or an $L1_0$-type FePt ordered alloy as a main constituent element, and contains several % by volume to 35% by volume of $SiO_2$, $TiO_2$, C, B, Ag, Cu, Au, Ni, Fe, Cr, Mn, Pd, or the like as an additive as needed. For example, a high Hk magnetic film of CoCrPt—$SiO_2$, $L1_0$FePt-A-C, or $L1_0$FePt—$SiO_2$ is used. Here, in the perpendicular magnetic recording layer, the magnetic exchange interaction between crystalline grains is controlled by mixing an appropriate oxide, carbide, nitride, or boride, such as Ti, Nb, Zr, Hf, Cu, Cr, Co, Si, or Al, or a mixture thereof, in the target material, and causing such a non-magnetic material to be segregated into the crystalline grain boundary by 0.5 to 2 nm by adjusting the film forming condition. The protection layer 32 is C, FCAC, or the like.

The respective layers are formed by using a magnetron sputtering facility having a ultrahigh vacuum chamber, a protection film forming facility, a lubricating layer forming facility, or the like. Arrows 37 and 38 indicate the upward and downward magnetization, respectively, recorded in the perpendicular magnetic recording medium. By achieving a high coercive force by increasing the average magnetic anisotropy field of the magnetic film, sufficient recording with the magnetic field from the conventional main pole-type magnetic head is prevented, thus providing a structure particularly suitable for narrow-track magnetic recording.

The structure of the perpendicular magnetic recording layer is not limited to the two-layer structure and may be a single layer, a composition graded-type film structure, or a multilayer structure having three or more layers, as long as it has high coercive force. Further, an intermediate layer for controlling the magnetic coupling may be disposed between the respective layers as needed. When the configuration or the magnetic characteristics of the perpendicular magnetic recording is close to those of a single-layer medium, it is preferable that the effective resonance frequency of the magnetization in a recording magnetization applied state is not greatly different from the oscillation frequency of the high frequency magnetic field of the STO 40. In the case of a multilayer structure, it is particularly preferable to make the magnetic anisotropy field Hk of the upper-most layer magnetic layer greater than 15 kOe and more preferably greater than 20 kOe, and greater than the adjacent lower layer, whereby energy absorption from the STO high frequency magnetic field, which has strong spacing dependency compared with the recording field, can be most efficiency performed.

Further, at least one non-magnetic layer for characteristics control may be disposed between the soft magnetic underlayer 35 and the substrate 36. In order to increase the crystallographic orientation, crystalline grain diameter, magnetic characteristics and their uniformity and the like of the magnetic layers 33 and 34, at least one non-magnetic intermediate layer of Ru or the like for characteristics control, a magnetic intermediate layer, and additionally a non-magnetic intermediate layer and the like may be disposed between the soft magnetic underlayer 35 and the magnetic layer 34. Further, the soft magnetic underlayer 35 may have a two-layer structure sandwiching Ru or an Ru alloy or the like in order to increase its soft magnetic characteristics or uniformity.

While FIG. 2 shows the example in which the magnetic layers 33 and 34 and the like are provided on one side of the substrate 36, they may be provided on both sides of the non-magnetic substrate 36. While according to the present embodiment the magnetic layer of the perpendicular magnetic recording medium 30 is a continuous film by way of example, the magnetic layer may be a discrete track film or a pattern film comprising a substrate on which a magnetic pattern of approximately 10 nm is disposed.

According to the present embodiment, in the configuration shown in FIG. 2, the microwave assisted magnetic recording head having the non-magnetic alloy intermediate layer using Ag as the principal constituent element and the perpendicular magnetic recording medium with the following configuration were produced as prototype models, and their characteristics were evaluated.

Slider 50: thin and long femto type ($1 \times 0.7 \times 0.2$ mm$^3$)
Head protection film (FCAC): 1.8 nm
Read gap length $G_s$: 18 nm
Sensor element 12: CPP-GMR ($T_{rw}$=30 nm)
First recording pole 22: FeCoNi($T_{WW}$=80 nm)
Second recording pole 24: CoFe
STO recording element 40: $Cu_{0.99}Au_{0.01}$(4 nm)/Ru(6 nm)/$Co_2Fe(Ga_{0.5}Ge_{0.5})$(10 nm)/$Ag_{1-x-y}Cu_xX_y$(2 nm)/[$Co_{0.85}Pt_{0.15}$/$Ni_{0.8}Fe_{0.2}$](10 nm)/$Ti_{0.8}Cr_{0.2}$(10 nm)
FGL: $W_{FGL}$=36 nm, element height=40 nm
Medium substrate: 3.5 inch NiP-plated Al alloy substrate
Medium structure: lubricating film (1 nm)/C(2 nm)/($Co_{0.5}Pt_{0.5}$)—(CrSiTi)$O_2$(2 nm)/CoCrPt—$SiO_2$C(10 nm)/Ru(10 nm)/CoFeTaZr(10 nm)/Ru(0.5 nm)/CoFeTaZr(10 nm)

The STO recording element included the $Ti_{0.8}Cr_{0.2}$ underlayer on which the [$Co_{0.85}Pt_{0.15}$/$Ni_{0.8}Fe_{0.2}$] spin injection layer, the $Ag_{1-x-y}Cu_xX_y$ intermediate layer, the $Co_2Fe(Ga_{0.5}Ge_{0.5})$FGL, Ru, and the $Cu_{0.99}Au_{0.01}$ cap layer were disposed. As the added element X for the non-magnetic intermediate layer, Au, Ru, Pd, and Rh were used, with the composition x of 0.1 and 0.15 and the composition y of 0.01 and 0.02. The element was energized from the spin injection layer side toward the FGL side to cause high speed rotation of the FGL, causing oscillation of a high frequency magnetic field.

The magnetic anisotropy field Hk of the perpendicular magnetic recording medium magnetic layers 33 and 34 was 22 kOe and 18 kOe, respectively.

Effects of Present Embodiment

With respect to both of the added element compositions x and y, the lattice constant matching between the Co$_2$Fe (Ga$_{0.5}$Ge$_{0.5}$) Heusler alloy layer and the [CoPt/NiFe] magnetic super-lattice layer and the non-magnetic alloy intermediate layer was 0.5% to 1%.

When the characteristics of the microwave assisted magnetic recording head and the perpendicular magnetic recording medium were evaluated by magnetic read/write characteristics evaluation equipment, the obtained microwave assist effect was such that the O/W was higher in each set of compositions in the case of Cu with the additives of Au, Ru, Pd, and Rh by approximately 1.3 dB, 1 dB, 1.2 dB, and 1.1 dB, respectively, compared with the case where Ag was used as the non-magnetic intermediate layer of the magnetic head according to conventional technology, and in each case, the S/N was also increased by approximately 1 dB.

By using the TiCr alloy in the underlayer, the lattice mismatch with the [CoPt/NiFe] magnetic super-lattice became 1.5%, which is a high lattice matching compared with the 3.5% in the case of a Ru/Ta underlayer according to conventional technology, and the S/N was increased by 0.8 dB compared with conventional technology, thus indicating a similarly good assist effect. By using the composition CuAu/Ru in the cap layer, the spin injection efficiency was improved by 5% compared with when an Ru single-layer thin film was used.

The magnetic head was subjected to accelerated evaluation to test its corrosion resistance through a high-temperature/high-humidity test with the humidity 95% and the temperature 60° C. for two days. As a result, the S/N at the time of microwave assisted recording decreased by 1 dB and 1.5 dB in the case of the magnetic head using Cu and Ag, respectively, as the non-magnetic intermediate layer according to conventional technology. On the other hand, no degradation in S/N was observed during microwave assisted recording in the case of the magnetic head according to the present embodiment. Also, no S/N degradation was observed during microwave assisted recording in the electric current energization reliability accelerated test at 60° C.

While the best result was obtained when the CuAu/Ru alloy cap layer, the TiCr alloy underlayer, and the AgCuX alloy intermediate layer were all used in combination, the S/N was increased by 0.5 dB and 0.2 dB respectively when only one of the underlayer and the cap layer was alloyed, compared with when no alloying was implemented.

Second Embodiment

According to the present embodiment, an STO structure using a magnetic material by which a strong high frequency magnetic field can be obtained, and the microwave assisted magnetic recording head with a recording pole structure shown in FIG. 8 will be described.
(Microwave Assisted Magnetic Recording Head and Magnetic Recording Medium)

Figure 8:
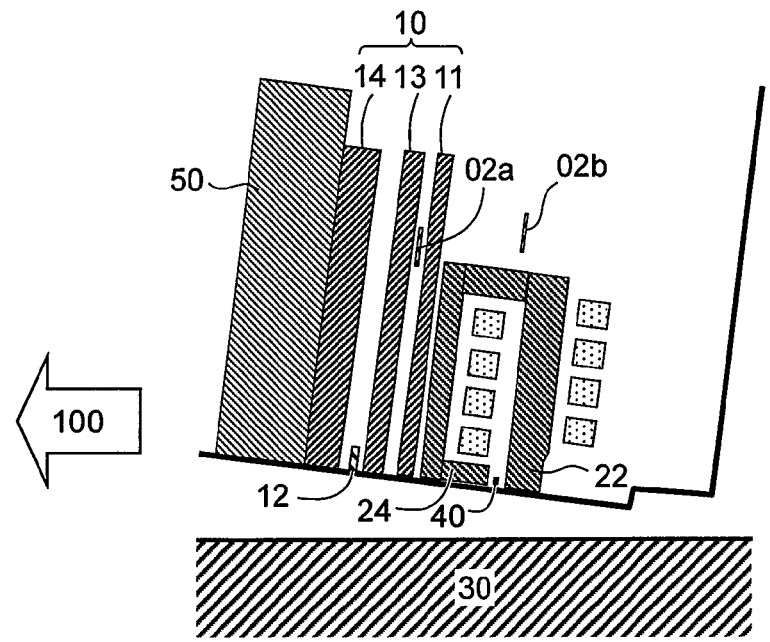
FIG. 8 illustrates a structure example in the vicinity of the recording gap of the microwave assisted magnetic recording head.

In FIG. 8, as in FIG. 2, 40 designates the STO, 10 designates the read head portion, 11 designates the shield layer, 12 designates the read sensor element, 13 and 14 designate the upper and lower magnetic shields, and 02a and 02b designates the TFC element portion and the like. According to the present embodiment, the recording poles 22 and 24 comprise the same magnetic material, with the recording pole 22 provided with a four-turn coil disposed around it for increased magnetization efficiency. For clearance control, the TFC 02a of a NiCr thin film with the resistance 80Ω was disposed between the shield layer 11 and the upper magnetic shield layer 13, and the TFC 02b was disposed substantially directly above the sensor 12 in order to improve controllability of the position of the STO 40 during recording and the read sensor element 12 during reading. The recording gap length G$_L$ was 45 nm, the distance between the tip of the magnetic pole 22 and the FGL surface was 15 nm, the STO element height was 60 nm, and the FGL width W$_{FGL}$ was 50 nm.

In the microwave assisted magnetic recording/reproducing head according to the present embodiment, a magnetic super-lattice material with high degree of design freedom was used for the spin injection layer 43 and the FGL 41 of the for the STO 40, and as a magnetic material, a Co-based material with high crystal lattice axial symmetry facilitating easy setting of the magnetic easy axis direction was used. Namely, both the spin injection layer and the FGL were formed by a magnetic super-lattice thin film of at least two stacked layers of: a magnetic alloy thin film containing at least 50% or more of Co and, as described with reference to the first embodiment, at least 0.1 at % or more in total and not more than 25 at % independently of at least one element selected from the second additive group except for Cu; and a magnetic alloy thin film containing at least 50 at % or more of at least one element selected from the group consisting of Fe and Ni and at least 0.1 at % or more in total and not more than 25 at % independently of at least one element selected from the second additive group except for Cu.

The oscillation frequency, strength, oscillation stability, and the like of the high frequency magnetic field are greatly influenced by the perpendicular magnetic anisotropy of the magnetic film. Thus, with regard to the configuration, saturation magnetization, and magnetic anisotropy of the magnetic super-lattice thin film, it is preferable to optimize the effective magnetic anisotropy including the demagnetization field to be adapted for the high frequency magnetic field and microwave assisted recording. According to the present embodiment, as the spin injection layer, the magnetic super-lattice of the Co-based alloy and the Ni-based alloy with high perpendicular magnetic anisotropy, corrosion resistance, and electric current energization reliability was used. Further, as to the FGL, because the high frequency magnetic field from the STO is increased in proportion to the saturation magnetization of the FGL, the material of the FGL preferably has a high saturation magnetization Ms. According to the present embodiment, the magnetic super-lattice thin film of the Co-based alloy and the Fe-based alloy was used.

For example, regarding the composition of the Co-based alloy and the Fe-based alloy of the FGL, in view of the fact that as the lattice constant of the Co-based magnetic film is increased, the wave functions of the 3d electrons of Co become symmetrical and the perpendicular magnetic anisotropy at their interface becomes large, the compositions were determined as follows.

When Co is added to Fe, in the bcc structure composition region, the saturation magnetization reaches a maximum value of 2.45 T at the Co added amount of 30 at %. When Fe is added to Co, the saturation magnetization increases in the fcc structure region as Fe is added and reaches 2 T at 22 at %. Thus, two to 25 layers of a CoFe alloy of fcc structure of Co to which not more than 22 at % of Fe was added, and an FeCo alloy of bcc structure of Fe to which less than 78 at % of Co was added, each with film thicknesses of 0.2 nm, 0.4 nm, 0.5 nm, 0.6 nm, and 0.8 nm, were formed on a glass substrate, using Cu with the film thickness of 2 nm and a CoHf alloy layer with the film thickness of 2 nm as underlayer films, and their characteristics were evaluated by using an X-ray diffraction apparatus and a vibrating sample magnetometer (VSM).

As a result, it has been confirmed that all of the [CoFe/FeCo] magnetic super-lattice thin films had fcc (111) orientation and were negative perpendicular magnetization films. In the foregoing, particularly preferable characteristics were obtained in the case of the FeCo magnetic alloy of Fe with the added Co when the added amount was 0.1 to 70 at %. In the case of the CoFe magnetic alloy of Co with the added Fe, the preferable magnetic characteristics including magnetic anisotropy and saturation magnetization were stably obtained when the added amount was 0.1 to 20 at %.

When a simple substance metal such as Ta, Cu, Ti, and Pt was used as the underlayer film according to conventional technology, there is a difference between when the magnetic super-lattice thin film was formed directly on the glass substrate and when, as in the magnetic head, a magnetic pole material of CoFe, CoNiFe, or the like is formed on the substrate first and then the magnetic super-lattice thin film is formed via such an underlayer. When the configuration is the same as the magnetic head, the magnetic characteristics reproducibility was low and not preferable. However, according to the Cu/CoHf alloy underlayer of the present embodiment, stable magnetic characteristics were obtained constantly, which was preferable.

When the CoFe magnetic alloy or the FeCo magnetic alloy was 50 at % and when at least 0.1 at % or more in total and not more than 25 at % independently of at least one kind of element M selected from the second group except for Cu was added, excellent characteristics in terms of the film structure and corrosion resistance were obtained, which was particularly preferable. Thus, further, two to 25 layers of each of [CoFeM magnetic alloy/FeCo magnetic alloy], [CoFe magnetic alloy/FeCoM magnetic alloy], and [CoFeM magnetic alloy/FeCoM magnetic alloy] magnetic super-lattice thin films were formed, with the thin film of each constituent element measuring 0.2 nm, 0.4 nm, 0.5 nm, 0.6 nm, and 0.8 nm, on a glass substrate using Cu with the film thickness of 2 nm and a CoHf alloy layer with the film thickness of 2 nm as underlayer films, and their characteristics were evaluated by using the X-ray diffraction apparatus and the vibrating sample magnetometer (VSM). As a result, all of the magnetic super-lattice thin films had fcc (111) orientation and were negative perpendicular magnetization films. Thus it has been confirmed that high corrosion resistance and electric current energization reliability can be obtained while preferable magnetic anisotropy and saturation magnetization for the FGL were maintained. In the foregoing, while it has been confirmed that the FGL oscillates most stably when the film thickness of each constituent element of the magnetic super-lattice has a single period, similar oscillation characteristics were obtained in the case of a periodic modulation-type super-lattice combining different film thicknesses as needed.

Thus, next, the STO was configured by using a Cu-based alloy and the like having high lattice matching with the magnetic super-lattice layers for the non-magnetic intermediate layer 42, and, with regard to the non-magnetic underlayer 45, making the lattice constant mismatch with the magnetic layer 43 and the non-magnetic alloy intermediate layer not more than 4% and more preferably not more than 1.5%. As the material of the non-magnetic underlayer, as in the first embodiment, a single-layer or laminated non-magnetic alloy thin film was used. For the cap layer 46, too, it is preferable to use the same material and configuration as the non-magnetic underlayer, as in the first embodiment. When the recording poles are doubled as electrodes, it was preferable to increase their spin injection resistance so as to prevent the spin from the recording poles from influencing the magnetization rotation layer, and it was more preferable to use a laminated film with a material with a long spin scattering length, such as a Cu alloy or an Ag alloy, as in the first embodiment. Thus, an STO element having particularly strong high frequency magnetic field efficiency, electric current energization reliability, corrosion resistance, and the like was configured.

For the read sensor element 12, a TMR sensor including MgO, ZnO, GaO, or the like as a tunnel barrier layer with the $T_{rw}$ of 30 nm was used.

For the perpendicular magnetic recording medium 30 shown in FIG. 2, the magnetic anisotropy field Hk of the upper-most magnetic layer 33, where the microwave assist effect is the strongest, was made greater than 20 kOe, and the constituent elements, film thickness, and the like of the magnetic films were adjusted such that sufficient recording cannot be performed with the recording field from the recording pole 22 and can be performed only when the STO 40 was simultaneously operated.

An embodiment of the magnetic head and the perpendicular magnetic recording medium according to the above configuration is as follows.

Slider 50: thin and long femto type (1×0.7×0.2 mm$^3$)
Head protection film (FCAC): 1.8 nm
Read element 12: TMR ($T_{rw}$=30 nm)
Read gap length $G_s$: 17 nm
First recording pole 22: FeCoNi ($T_{WW}$=60 nm)
Second recording pole 24: FeCoNi
STO recording element 40: $Ag_{0.95}Au_{0.05}$ (4 nm)/$Ru_{0.95}Mo_{0.05}$ (6 nm)/[$Co_{0.9}Fe_{0.1}$/$Fe_{0.8}Co_{0.2}$] (10 nm)/$Cu_{1-x-y}Ag_xM_y$ (2 nm)/[$Co_{0.9}Nb_{0.1}$/$Ni_{0.8}Fe_{0.2}$] (6 nm)/$Ru_{0.8}Cu_{0.2}$ (5 nm)/$Cr_{0.9}Nb_{0.1}$ (5 nm)
FGL width: $W_{FGL}$=36 nm
Medium substrate: 3.5-inch NiP-plated Al alloy substrate
Medium structure: lubricating film (1 nm)/C (2 nm)/CoPt—(SiTiCr)O$_2$ (3 nm)/CoCrPt—SiO$_2$C (10 nm)/Ru (10 nm)/CoFeTaZr (10 nm)/Ru (0.5 nm)/CoFeTaZr (10 nm)

As the STO recording element, the spin injection layer was a [$Co_{0.9}Nb_{0.1}$/$Ni_{0.8}Fe_{0.2}$] magnetic super-lattice of $Co_{0.9}Nb_{0.1}$ and $Ni_{0.8}Fe_{0.2}$ which were stacked to 0.2 nm and 0.4 nm, respectively. The FGL was a [$Co_{0.9}Fe_{0.1}$/$Fe_{0.8}Co_{0.2}$] magnetic super-lattice of a CoFe alloy of Co with 10 at % of Fe added and a FeCo alloy of Fe with less than 20 at % Co added, which were stacked to 0.2 nm and 0.2 nm, respectively, the super-lattice having negative perpendicular magnetic anisotropy. The non-magnetic alloy intermediate layer was $Cu_{1-x-y}Ag_xM_y$ with Au, Pt, Ir, Os, and Ta used as the added element M. The composition x was 0.1 and 0.2, and the composition y was 0.01 and 0.02.

The magnetic anisotropy field Hk of the perpendicular magnetic recording medium magnetic layers 33 and 34 was 20 kOe and 19 kOe, respectively.

Effects of Present Embodiment

The non-magnetic alloy intermediate layer $Cu_{1-x-y}Ag_xM_y$ had the lattice constant matching of 1 to 1.5% with the [CoFe/FePt] and [CoNb/NiFe] magnetic super-lattice magnetic layers for any of the added element M and compositions x and y. When the characteristics of these microwave assisted magnetic recording/reproducing head and perpendicular magnetic recording medium were evaluated by using magnetic read/write characteristics evaluation equipment, the S/N was increased by approximately 1.5 dB when Au, Pt, Ir, Os, or Ta was added, compared with when Cu was used as the non-magnetic intermediate layer of the magnetic head as according to conventional technology, thus indicating a good microwave assist effect. Further, when the RuCu/CrNb alloy underlayer was used as the underlayer, the lattice mismatch with the [CoNb/NiFe] magnetic super-lattice was 2%, indicating a high lattice matching compared with the 5% of the conventional technology, and the S/N was increased by 0.7 dB compared with when using the Ru/Ta or Ti/Ta underlayer, thus indicating a good assist effect. When the AgAu/RuMo laminated film was used for the cap layer, the critical current was improved by 5% and the average energization life was improved by 10% over the Ta single-layer film according to conventional technology.

Further, when the magnetic head was evaluated through a high-temperature/high-humidity test at the humidity 85% and the temperature 50° C. to test its corrosion resistance for two days, no characteristics degradation in the S/N and the like during microwave assisted recording was observed in the magnetic head according to the present embodiment.

While the best result was obtained when all of the AgAu/RuMo alloy cap layer, the RuCu alloy underlayer, and the CuAgM alloy intermediate layer were used in combination, the S/N was improved by approximately 0.7 dB and 0.3 dB when only one of the underlayer and the cap layer was alloyed, respectively, compared with when no alloying was implemented.

Third Embodiment

According to the present embodiment, a microwave assisted magnetic recording/reproducing head having the STO with the configuration of FIG. 10 and the recording pole structure of FIG. 9 will be described. According to the present embodiment, the spin injection layer 43 is a hard magnetic material having a magnetic anisotropy axis in a direction perpendicular to the film plane, and the FGL 41 has the effective magnetic easy plane in the film plane, whereby the magnetizations of both of the layers are instantaneously rotated in response to the magnetization reversal in the recording gap so that more stable oscillation can be obtained at high frequencies.

(Magnetic Head and Perpendicular Magnetic Recording Medium)

Figure 9:
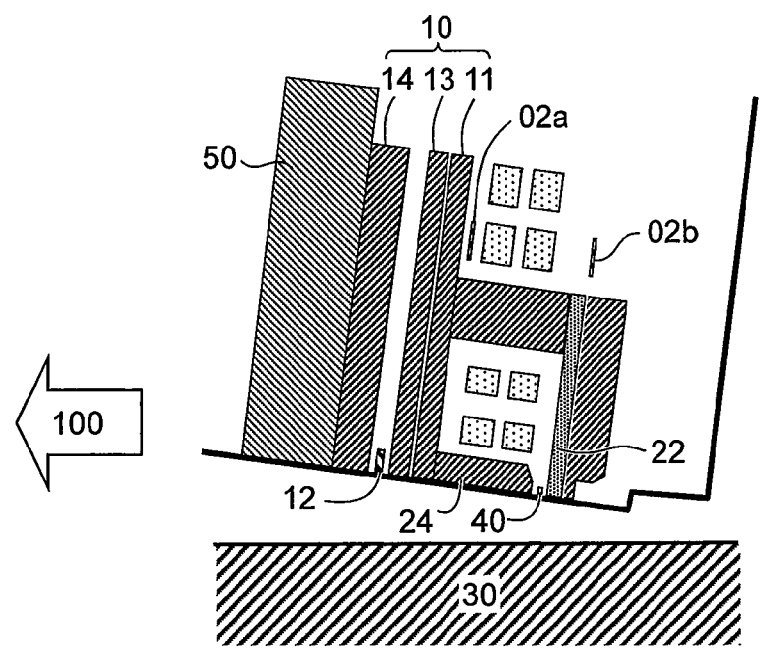
FIG. 9 illustrates a structure example in the vicinity of the recording gap of the microwave assisted magnetic recording head.

In the microwave assisted magnetic recording/reproducing head shown in FIG. 9, as in FIG. 2, 40 designates the STO, 10 designates the read head portion, 11 designates the shield layer, 12 designates the read sensor element, 13 and 14 designate the upper and lower magnetic shields, and 02a and 02b designate the TFC element portions and the like. However, the present embodiment has the following major features. Namely, the recording pole 22 has a two-layer structure and includes a high magnetic flux density material in the vicinity of the recording gap so as to increase the recording field strength and recording field gradient, and, for clearance control, the TFC 02a of a NiCr thin film with the resistance of 80Ω is disposed substantially at the center between the read element 12 and the STO 40. The recording gap length $G_L$ is 45 nm, the distance between the tip of the magnetic pole 22 and the surface of the FGL is 15 nm, the STO element height is 75 nm, the FGL width $W_{FGL}$ is 50 nm, and the coil disposed around the rear portion of the magnetic pole core has four turns.

Figure 10:
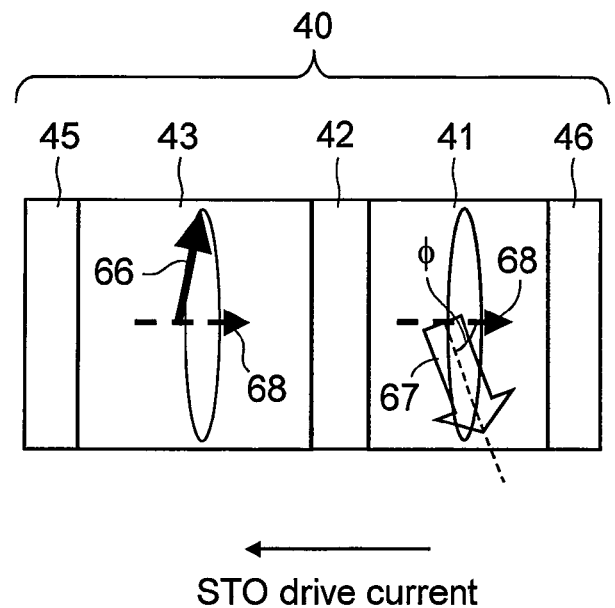
FIG. 10 is a schematic cross sectional view of an STO.

The STO mounted in the present microwave assisted magnetic recording/reproducing head includes, as shown in a schematic cross sectional view of FIG. 10, the FGL 41 of a magnetic material having negative magnetic anisotropy field and having an effective magnetic easy plane in the film plane, such as a magnetic super-lattice thin film of Fe or an Fe-based alloy such as $Fe_{0.8}Co_{0.2}$, and Co or a Co-based alloy such as $Co_{0.94}Fe_{0.01}Pt_{0.05}$; the spin injection layer 43 which is a perpendicular magnetization layer of a hard magnetic thin film having magnetic anisotropy axis in a direction perpendicular to the film plane, such as a magnetic super-lattice of Ni or a Ni-based alloy such as $Ni_{0.99}Rh_{0.01}$ or $Ni_{0.9}Fe_{0.1}$, and Co or a Co-based alloy such as $Co_{0.9}Pt_{0.1}$; and the Cu-based non-magnetic intermediate layer 42 of $Cu_{1-x-y}Au_xM_y$ or the like sandwiched between them. The added element M is an added element from the second group, such as Zr, Hf, V, Nb, or Rh, as described with reference to the first embodiment.

The FGL 41 and the spin injection layer 43 both have the magnetic easy axis 68 perpendicular to the film plane. The FGL is provided with an effective negative magnetic anisotropy field by designing such that the magnitude of the magnetic anisotropy magnetic field due to material and the effective demagnetization field of the spin injection layer 43 in the film plane perpendicular direction are substantially counterbalanced in opposite directions. Further, electric current was caused to flow from the FGL side to the spin injection layer side such that the magnetizations 66 and 67 of both layers could reach high-speed large rotation instantaneously in response to magnetization reversal. At this time, because the magnetizations 66 and 67 rotate at high speed while maintaining a phase shift of approximately 180°, it is preferable to adjust the material and film thickness of the non-magnetic intermediate layer 42 such that the magnetizations 66 and 67 are anti-ferromagnetically coupled. Further, in the spin injection layer, it is preferable to make the Co-based alloy magnetic layer thicker than the Ni-based alloy magnetic layer so that the magnetic anisotropy magnetic field due to material and the effective demagnetization field of the FGL in the film plane perpendicular direction are substantially counterbalanced in opposite directions. The oscillation frequency (Larmor frequency) is lower in the FGL than in the spin injection layer when independently evaluated; however, when operated in the present structure, they oscillate immediately at the same frequency in response to the polarity reversal of the magnetic field in the recording gap.

This is due to the following. By adopting the present structure, in the FGL layer with high orientation and having negative magnetic anisotropy, upon polarity reversal of the magnetic field in the recording gap substantially perpendicular to the film plane, high-speed rotation with fast followability can be produced in response to magnetization reversal by slightly changing the inclination angle of the rotation magnetization and remaining substantially in the plane of rotation, instead of following the magnetization reversal mechanism involving coercive force as in the conventional FGL having strong perpendicular anisotropy. Also, in the spin injection layer having perpendicular magnetic anisotropy according to the present embodiment, because its orientation is high, its interaction with the FGL is uniform with the magnetization substantially remaining in the plane of magnetization rotation, so that the relative angle with the magnetic anisotropy axis is hardly changed before and after the magnetic field polarity reversal in the recording gap. Thus, the spin injection layer having perpendicular magnetic anisotropy can produce high frequency oscillation immediately in response to the polarity reversal of the magnetic field in the recording gap, as opposed to the normal magnetization reversal mechanism causing magnetization reversal based on the value of coercive force. A similar effect was also observed in a three-layer magnetic layer structure in which the spin injection layer was stacked via an additional intermediate layer. In the case of the three-layer structure, the spin injection layer that rotates at high speed with the FGL with a phase difference of about 180° is one or both of the two layers.

The present effect was pronounced in the ring type magnetic pole structure according to the present embodiment in which the STO driving magnetic field enters the STO film plane perpendicularly. However, it was also observed in a magnetic head of main pole-shield type recording pole structure, as in the ninth embodiment.

Further, the non-magnetic metal underlayer 45 and the cap layer 46 were disposed on both sides of the STO, and the recording poles 22 and 24 were magnetically coupled in a rear end portion of the recording head but substantially electrically insulated, so that the STO can be energized via the magnetic poles doubling as electrodes. In this case, it is preferable to increase the spin injection resistance so that the spin injected from the recording poles during energization does not influence the magnetization rotation layer, and it is more preferable to use a laminated film of a material with long spin scattering length, such as a Cu alloy or an Ag alloy, and a high melting-point electromigration-resistant material. It was also preferable to configure the power supply 44 for constant voltage so that the current density that flows through the STO element can be made constant even when the STO element dimensions are varied.

With regard to the underlayer 45, it was preferable to decrease the damping constant so as to obtain a strong high frequency oscillation magnetic field, and to keep the lattice constant mismatch with the magnetic layer 43 and the non-magnetic alloy intermediate layer 42 to be not more than 4% and more preferably not more than 1.5%. As the material, a single-layer or laminated non-magnetic alloy thin film of TiCu, NbTi, OsTa, RuTi, CuHf, or the like was used. As to the cap layer 46, it was preferable to decrease the damping constant so as to obtain a strong high frequency oscillation magnetic field, and also to use the same alloy material and configuration as the underlayer, based on a high melting-point material, such as Pt or Ru, so as to suppress electromigration of the STO 40 and ensure high electric current energization reliability. When the recording poles double as electrodes, it is preferable to increase their spin injection resistance so as to prevent the spin from the recording poles from influencing the magnetization rotation layer, and it is more preferable to use a laminated film with a material with long spin scattering length, such as a Cu alloy or an Ag alloy.

The read sensor element 12 had two layers of Heusler alloy stacked via an Ag alloy to increase lattice constant matching. The read sensor element 12 was of scissors type providing a high magneto-resistance effect and had the sensor width $T_{rw}$ of 38 nm.

In the perpendicular magnetic recording medium, as in the first embodiment, the magnetic anisotropy field Hk of the magnetic layer 33 was increased on the surface side where the microwave assist effect acts most strongly. The constituent elements, film thickness, and the like of the magnetic film were adjusted such that sufficient recording cannot be performed with the recording field from the recording pole 22 but can be performed only when the STO 40 was simultaneously operated.

In the following, the details of the specifications of the magnetic head and the magnetic recording medium will be described.

Slider 50: thin and long femto type (1×0.7×0.2 mm³)
FCAC 51: 1.8 nm
Read gap length $G_s$: 16 nm
Read element 12: $Co_2Fe(Ga_{0.5}Ge_{0.5})/Ag_{0.79}Cu_{0.2}Au_{0.01}/Co_2Fe(Ga_{0.5}Ge_{0.5})$ ($T_{rw}$=30 nm)
First recording pole 22: CoFe ($T_{WW}$=50 nm)
Second recording pole 24: FeCoNi
STO recording element 40: $Cu_{0.99}Pt_{0.01}$(2 nm)/$Cr_{0.9}Ti_{0.1}$(2 nm)/$[Co_{0.80}Fe_{0.19}Pt_{0.01}/Fe_{0.99}Rh_{0.01}]$(12 nm)/$Cu_{0.99-y}Au_{0.01}M_y$(4 nm)/$[Co_{0.95}Ta_{0.05}/Ni_{0.95}Ru_{0.05}]$(4 nm)/$Cu_{0.95}Hf_{0.05}$(2 nm)/$Ru_{0.9}Ti_{0.1}$(2 nm)
FGL width: $W_{FGL}$=50 nm
Medium substrate: 2.5 inch NiP-plated Al alloy substrate
Medium structure: lubricating layer (1 nm)/C(2 nm)/$((Co_{0.9}Cr_{0.1})_3Pt)$—B(2 nm)/$(Co_3Pt)$—$(SiCrTa)O_2$(8 nm)/Ru (10 nm)/CoFeTaZr(10 nm)/Ru(0.5 nm)/CoFeTaZr(10 nm)

According to the present embodiment, the spin injection layer is a $[Co_{0.95}Ta_{0.05}/Ni_{0.95}Ru_{0.05}]$ magnetic super-lattice, the FGL is a $[Co_{0.80}Fe_{0.19}Pt_{0.01}/Fe_{0.99}Rh_{0.01}]$ magnetic super-lattice of a magnetic material having negative magnetic anisotropy field and an effective magnetic easy plane in the film plane, and the non-magnetic intermediate layer is $Cu_{0.99-y}Au_{0.01}M_y$. The added element M is Zr, Hf, V, Nb, Rh, or Ta, and the composition y was 0.02 and 0.03. In the present structure, electric current was caused to flow from the FGL side toward the spin injection layer side, and the magnetizations in both layers are caused to reach high-speed large rotation instantaneously in response to magnetization reversal.

The perpendicular magnetic recording medium magnetic layers 33 and 34 are formed of an ordered alloy, with their magnetic anisotropy field Hk set at 24 kOe and 22 kOe, respectively.

Effects of Present Embodiment

The non-magnetic intermediate layer with the above added element and composition had the lattice constant matching of approximately 1.5% with the [CoFePt/FeRh] and [CoTa/NiRu] magnetic super-lattice magnetic layers, and the S/N was increased by about 1 dB compared with when Cu was used for the non-magnetic intermediate layer of the magnetic head according to conventional technology, thus indicating a good microwave assist effect. Particularly, when the film thickness was 4 nm, the [CoFePt/FeRh] and [CoTa/NiRu] were anti-ferromagnetically coupled, and the same microwave assist effect was obtained with approximately a 10% decrease in current compared with when the film thickness was 2 nm, thus indicating a high spin injection efficiency. The present effect was similarly observed in the alloys according to the present invention, such as CuRu, AgRu, and AuRu.

It has been confirmed by LLG simulation that the STO of the present configuration, in which not only the magnetization of the FGL but also the magnetization of the spin injection layer is caused to rotate at high speed by the current flowing from the FGL toward the spin injection layer side, has an approximately 10% increase in high frequency oscillation magnetic field strength and an approximately 10 to 20% increase in magnetic field gradient directly under STO, though close to linear polarization. In fact, compared with the magnetic head with the configuration according to the second embodiment where the total film thickness of the magnetic layer is the same at 16 nm, the S/N was increased by about 1.5 dB, indicating a good microwave assist effect.

Further, when the magnetic head was placed in an environment at the humidity of 95% and the temperature of 60° C. for two days in a high-temperature/high-humidity test to test to test its corrosion resistance, while the S/N degraded by about 1.5 dB during recording in approximately 20% of the cases in the case of the magnetic head using Cu for the non-magnetic intermediate layer according to conventional technology, no degradation in S/N during recording was observed in the magnetic head using the non-magnetic alloy intermediate layer according to the present invention, with respect to any of the added elements of Zr, Hf, V, Nb, Rh, and Ta. Further, in an accelerated electric current energization reliability test at 50°

C. and $10^9$ A/cm$^2$, a more than three-fold increase in reliability was confirmed compared with the magnetic head using Cu for the non-magnetic intermediate layer according to conventional technology.

While the best result was obtained when all of the CuPt/CrTi alloy cap layer, the CuAuM alloy intermediate layer, and the CuHf/RuTi alloy underlayer were used in combination, the S/N was improved by about 0.4 dB when only one was alloyed, compared with the case involving no alloying. When two were alloyed, an intermediate result was obtained.

Fourth Embodiment

According to the present embodiment, an example of STO configuration having the recording pole structure shown in FIG. 11 and basically the same magnetization arrangement as the first embodiment will be described, in which as shown in a schematic cross sectional view of FIG. 12, the non-magnetic intermediate layer has two layers.

(Microwave Assisted Magnetic Recording Head and Magnetic Recording Medium)

Figure 11:
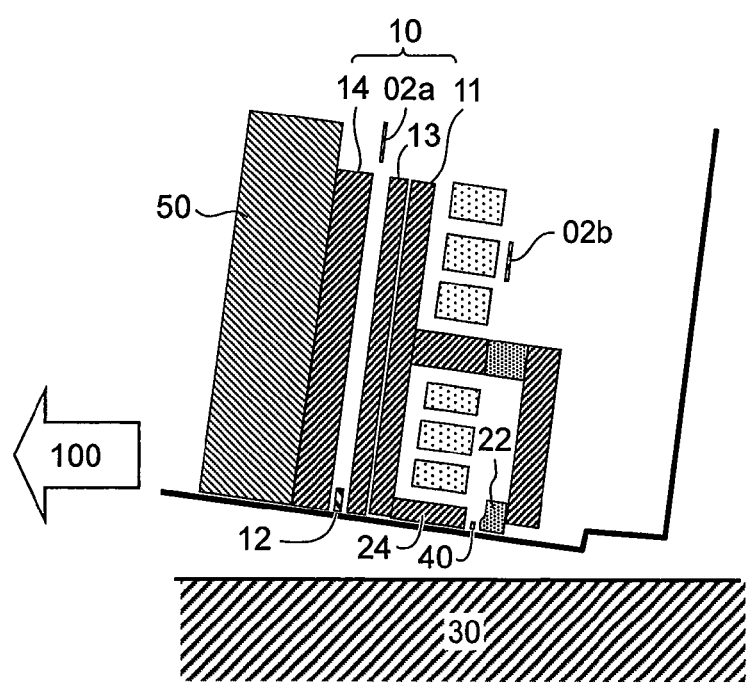
FIG. 11 illustrates a structure example in the vicinity of the recording gap of the microwave assisted magnetic recording head.

In the microwave assisted magnetic recording/reproducing head shown in FIG. 11, as in FIG. 2, 40 designates the STO, 10 designates the read head portion, 11 designates the shield layer, 12 designates the read sensor element, 13 and 14 designate upper and lower magnetic shields, and 02a and 02b designate the TFC element portions, and the like. However, according to the present embodiment, the recording pole 22 includes a high saturation magnetic flux density material only in the pole end and a rear portion of the magnetic pole, and the number of windings is three turns to decrease the inductance of the magnetic pole so as to increase high frequency recording characteristics. For clearance control, the TFC 02a of a NiCr thin film with the resistance of 80Ω is disposed substantially directly above the read element 12, and the TFC 02b is disposed substantially directly above the STO 40.

Figure 12:
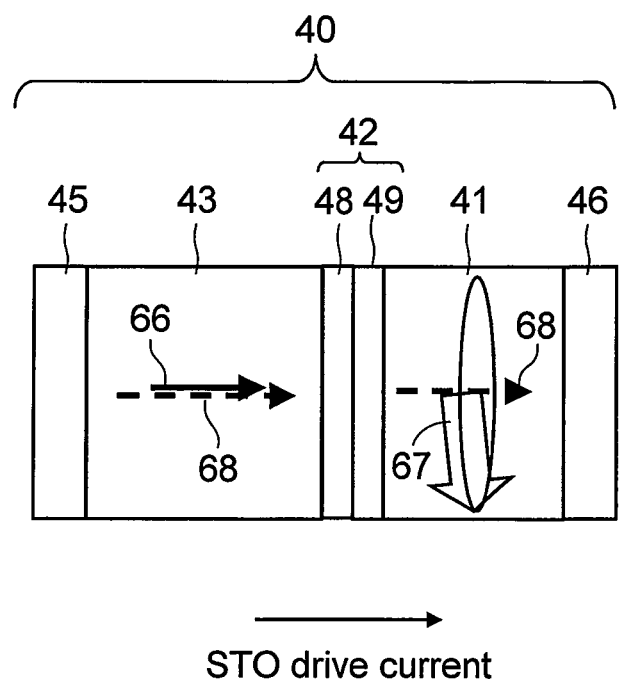
FIG. 12 is a schematic cross sectional view of the STO.

The STO 40 mounted in the present microwave assisted magnetic recording/reproducing head has the configuration shown in FIG. 12. Namely, the non-magnetic alloy intermediate layer 42 has at least two layers of a first non-magnetic intermediate layer 48 with a high lattice matching with the lower magnetic layer 43 that functions as the spin injection layer as in the first embodiment, and a second non-magnetic intermediate layer 49 with a high lattice matching with the upper magnetic layer 41, i.e., the FGL. Similarly, in the STO with the present configuration, as in the first embodiment, the STO is driven by energizing from the spin injection layer side so as to cause the magnetization 67 of the FGL 41 to be rotated at high speed. Because of the high lattice matching, the crystallographic orientation of the magnetic film and the magnetic characteristics uniformity are increased, so that a high frequency oscillation magnetic field with strong circular polarization can be obtained. The recording gap length $G_L$ is 45 nm, the distance between the end of the magnetic pole 22 and the FGL surface is 15 nm, the STO element height is 55 nm, and the FGL width $W_{FGL}$ is 36 nm.

An example of the STO 40 will be described below. In this example, the lower magnetic layer 43 is a Co$_2$Mn(Ga$_{0.5}$Ge$_{0.5}$) alloy having a larger lattice constant, and the upper magnetic layer 41 is a [Co/Ni] magnetic super-lattice or a [Co-based alloy/Ni-based alloy] magnetic super-lattice or the like of a Co-based alloy such as Co$_{0.8}$Ir$_{0.2}$, Co$_{0.99}$Fe$_{0.01}$, or Co$_{0.9}$Pt$_{0.1}$, and a Ni-based alloy such as Ni$_{0.8}$Fe$_{0.2}$ or Ni$_{0.8}$Co$_{0.2}$. The first and second non-magnetic intermediate layers 48 and 49 are a CuAgAu alloy and an AgCuQ alloy having high lattice matching with the magnetic layers. It is more preferable that the lattice matching of the first and second non-magnetic intermediate layers 48 and 49 is increased.

The underlayer 45 and the cap layer 46 are similar to those according to the first or third embodiment.

In the perpendicular magnetic recording medium 30 shown in FIG. 2, the magnetic anisotropy field Hk of the magnetic layer 33 is increased on the surface side where the microwave assist effect acts most strongly. The constituent elements, film thickness and the like of the magnetic film are adjusted such that sufficient recording cannot be performed with the recording field from the recording pole 22 and can be performed only when the STO 40 is simultaneously operated.

Slider 50: thin and long femto type (1×0.7×0.2 mm$^3$)
Head protection film (FCAC): 1.8 nm
Read gap length $G_s$: 17 nm
Sensor element 12: TMR ($T_{rw}$=30 nm)
First recording pole 22: CoFe ($T_{WW}$=100 nm)
Second recording pole 24: FeCoNi
STO recording element 40: Ag$_{0.95}$Zr$_{0.05}$(2 nm)/Cu$_{0.95}$Nb$_{0.05}$(2 nm)/Co$_2$Mn(Ga$_{0.5}$Ge$_{0.5}$)(12 nm)/Ag$_{0.79}$Cu$_{0.2}$Q$_{0.01}$(1 nm)/Cu$_{0.79}$Ag$_{0.20}$Au$_{0.01}$(1 nm)/[Co$_{0.97}$Ir$_{0.03}$/Ni$_{0.98}$Pt$_{0.02}$](4 nm)/Cu$_{0.80}$Pd$_{0.20}$(4 nm)
FGL width: $W_{FGL}$=36 nm
Medium substrate: 2.5 inch glass substrate
Medium structure: lubricating film (1 nm)/C(2 nm)/[CoPt/PtSi](3 nm)/CoCrPt—SiO$_2$C(12 nm)/Ru(10 nm)/CoFeTaZr (10 nm)/Ru(0.5 nm)/CoFeTaZr(10 nm)

In the STO according to the present embodiment, the spin injection layer was a [Co$_{0.97}$Ir$_{0.03}$/Ni$_{0.98}$Pt$_{0.02}$] magnetic super-lattice, the FGL was a Co$_2$Mn(Ga$_{0.5}$Ge$_{0.5}$) Heusler alloy thin film, and the non-magnetic intermediate layer had a two-layer structure of Cu$_{0.79}$Ag$_{0.20}$Au$_{0.01}$ and Ag$_{0.79}$Cu$_{0.2}$Q$_{0.01}$. The added element Q was Zr, Hf, V, Nb, Rh, or Ta, and the composition y was 0.01 and 0.02. Further, in the present structure, electric current was caused to flow from the FGL side toward the spin injection layer side, and the magnetizations of both layers were caused to reach high-speed large rotation instantaneously in response to magnetization reversal. On the slider 50, the TFCs 02a and 02b of a NiCr thin film with the resistance of 80Ω were disposed for clearance control purpose.

The perpendicular magnetic recording medium magnetic layer 33 was a magnetic super-lattice [CoPt/PtSi] having the magnetic anisotropy field Hk of 21 kOe. The magnetic anisotropy field Hk of the magnetic layer 34 was 15 kOe.

Effects of Present Embodiment

With respect to any of the added element Q and compositions, the lattice constant matching between the [CoIr/NiPt] magnetic super-lattice and the Cu$_{0.79}$Ag$_{0.20}$Au$_{0.01}$ non-magnetic alloy intermediate layer, the Co$_2$Mn(Ga$_{0.5}$Ge$_{0.5}$) Heusler alloy and the Ag$_{0.79}$Cu$_{0.2}$)X$_{0.01}$ non-magnetic intermediate layer, and the non-magnetic alloy intermediate layers of Cu$_{0.79}$Ag$_{0.20}$Au$_{0.01}$ and Ag$_{0.79}$Cu$_{0.2}$M$_{0.01}$ was 0.5 to 1%. When the characteristics of the microwave assisted magnetic recording head and the perpendicular magnetic recording medium were evaluated on the magnetic read/write characteristics evaluation equipment, compared with when Ag was used for the non-magnetic intermediate layer of the magnetic head according to conventional technology, the S/N was increased by 1.2 dB, 1 dB, 1 dB, 1 dB, and 0.8 dB when Zr, Hf, V, Nb, Rh, and Ta, respectively, were added as the added element Q, thus indicating a good microwave assist effect.

When the magnetic head was subjected to a high-temperature/high-humidity test with the humidity 95% and the temperature 60° C. to evaluate its corrosion resistance for two days, no degradation in S/N was observed during microwave assisted recording in the case of the magnetic head according to the present embodiment, as in the first to third embodiments. Further, in an accelerated electric current energization reliability test at 60° C. and $10^9$ A/cm$^2$, it has been confirmed that the average energization life was four times or more longer than that of the magnetic head using Ag for the non-magnetic intermediate layer according to conventional technology.

The two-layer non-magnetic intermediate layer according to the present embodiment was applied to the STO structure according to the third embodiment, and the element was energized from the FGL side toward the spin injection layer side to cause the FGL and the spin injection layer to rotate at high speed with opposite phases. In this case, too, the crystallographic orientation of the magnetic films and magnetic characteristics were improved by the high lattice matching between the magnetic layers and the intermediate layer, so that, compared with the third embodiment, linear polarization having a stronger high frequency magnetic field component was oscillated directly under the STO in a direction perpendicular to the STO film. Thus, the S/N was improved by 0.4 dB during microwave assisted recording compared with the third embodiment.

Fifth Embodiment

According to the present embodiment, the microwave assisted magnetic recording head will be described in which the recording pole has the main pole/auxiliary magnetic pole-type structure shown in FIGS. 13 and 14, which is a different configuration from the microwave assisted magnetic recording head shown in FIG. 2.

(Microwave Assisted Magnetic Recording Head)

Figure 14A:
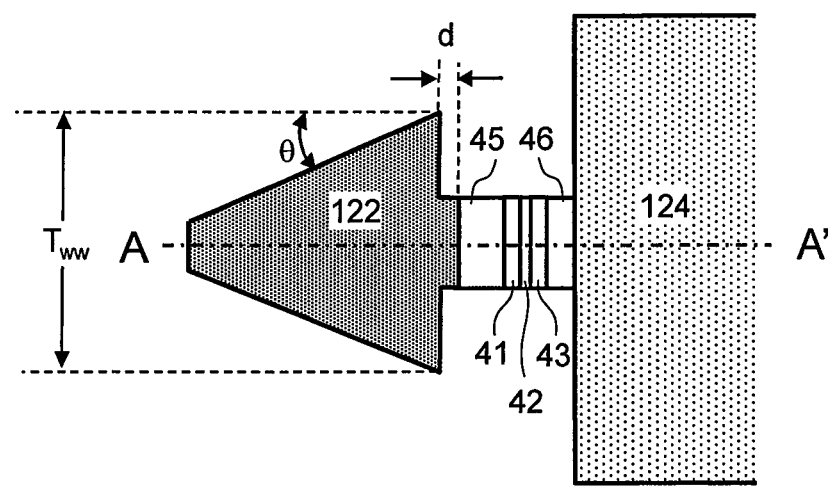
FIG. 14A illustrates a structure as viewed from the ABS plane.
Figure 14B:
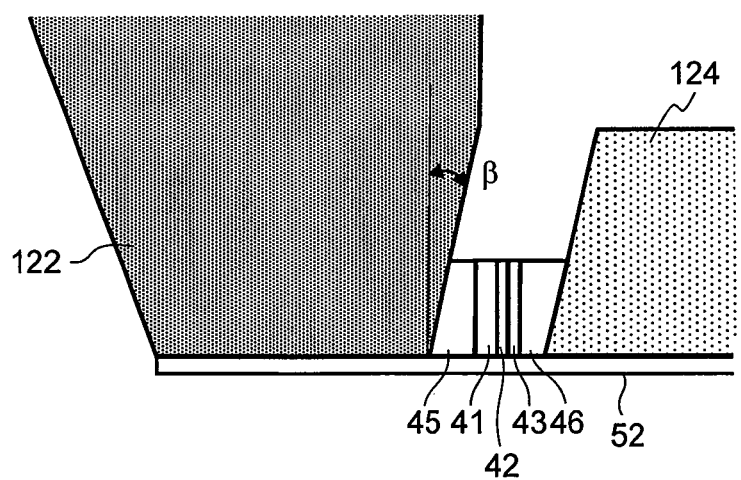
FIG. 14B is a cross sectional view in the vicinity of the magnetic head recording gap.

FIG. 13 is a conceptual diagram showing an example of the microwave assisted magnetic recording head and the perpendicular magnetic recording medium according to the present embodiment. FIG. 14A is a schematic view of the lower surface of the recording head in the vicinity of the gap portion, and FIG. 14B is a schematic cross sectional view taken along line AA' of FIG. 14A. The microwave assisted magnetic recording head apparatus of the present embodiment is similar to the first to fourth embodiments (FIG. 2) in basic configuration other than the recording pole. For example, 50 designates the slider, 51 designates the head protection layer, 52 designates the floating surface, 40 designates the STO, 10 designates the read head portion, 11 designates the shield layer, 12 designates the read sensor element, 13 and 14 designate the upper and lower magnetic shields, and 02a and 02b designate the TFC element portions, for example. The STO 40 has the same structure as shown in FIG. 2 (except that the order of stacking of 41 and 43 is changed). In FIG. 13, the underlayer 45 and the cap layer 46 are omitted.

Referring to FIG. 14A showing the pole portion structure as viewed from the ABS plane, the recording head portion 20 includes a wide recording pole (main pole) 122 shaped by etching at the STO portion to have substantially the same width as the STO so as to generate a perpendicular recording field 121 with substantially the same width as the high frequency magnetic field, a shield magnetic pole 124 for controlling the magnetization rotation direction and the like of the high frequency magnetic field oscillating element 40, and a coil 23 of Cu and the like for magnetizing the recording pole. A magnetic gap 125 is provided between the recording pole 122 and the shield magnetic pole 124. The oscillation control field 126 controls the magnetization direction, magnetization rotation direction, and the like of the high frequency magnetic field oscillating element 40.

According to the present embodiment, as shown in FIG. 14A, first, in the recording pole 122, a high saturation magnetic flux density soft magnetic film of FeCoNi, a CoFe alloy, or the like was formed by plating, sputtering, and the like, and formed into a substantially trapezoidal shape with a bevel angle θ of 10 to 20° with decreasing cross section area toward the ABS plane. In order to increase the STO control field 126, the magnetic pole was etched to a depth d of 1 to 40 nm and more preferably 5 to 20 nm, and to the STO width, and more preferably into substantially the same shape as the STO. Further, according to the present embodiment, as shown in FIG. 13 and FIGS. 14A and 14B, the main pole was narrowed from the four directions in the magnetic head travel direction and the track direction, thus forming a structure from which a strong recording field can be obtained. Thus, because the main pole 123 is narrowed on its four surfaces, the surface on which the STO is to be formed is inclined by an angle β of 10 to 20°, as shown in FIG. 14B. When the high frequency oscillating element STO including the FGL 41 is formed on the inclined surface, magnetic anisotropy is generally caused in a direction perpendicular to the inclination direction, and the high frequency oscillation efficiency of the STO is degraded by 10 to 20%. Thus, according to the present embodiment, as shown in FIGS. 14A and 14B, a non-magnetic filling layer 45 is formed on the main pole 122 and planarized to form the STO in the same manner as according to the first to fourth embodiments. By thus forming the STO perpendicular to the ABS plane 52, compared with the conventional main pole/auxiliary magnetic pole-type magnetic pole structure, it becomes possible to control the magnetic field distribution and strength of the STO driving magnetic field 126, the strength and application angle of the recording field 121, the application position of the high frequency magnetic field 47, the application position for the recording field 121, and the like in a balanced manner, and it has been confirmed that a strong high frequency magnetic field can be also stably obtained even in the case of the main pole/auxiliary magnetic pole-type magnetic pole. According to the present magnetic pole structure, as opposed to the magnetic pole structure according to the first embodiment, with respect to the magnetic recording medium for which recording is possible with only the recording pole, the foot print of the magnetic pole is determined by the main pole region where the strongest recording field is concentrated.

The width $T_{WW}$ (FIG. 14A) of the wider side of the trapezoidal recording pole of the recording element is designed and processed in accordance with the target recording field or recording density, and is on the order of 160 nm to 10 nm. The recording pole 122 as well as the shield magnetic pole 124 may be formed of a soft magnetic alloy thin film of a CoNiFe alloy, a NiFe alloy, or the like, surrounded via a non-magnetic layer in a so-called WAS structure (Wrap Around Structure). In FIG. 14, the order of stacking of the spin injection layer 43 and the FGL 41 may be reversed. However, because it is preferable to dispose the STO in the vicinity of the main pole, it is most preferable to use the same material as the underlayer for the non-magnetic filler and provide the STO structure in which the FGL 41 is formed on the underlayer 45 first and then the non-magnetic intermediate layer 42, the spin injection layer 41, and the cap layer 46 are stacked in order thereon, as shown in FIG. 14.

In a perpendicular magnetic recording medium 130, the magnetic layer had three layers 133, 139, and 134, and the magnetic anisotropy field Hk of the upper-most layer where the microwave assist effect acts most strongly was increased, and the constituent elements, film thickness, and the like of the magnetic film were adjusted so that sufficient recording cannot be performed with the recording field from the recording pole and can be performed only when the STO 40 is simultaneously operated.

In the following, the configuration and specifications of the microwave assisted magnetic recording head and the perpendicular magnetic recording medium according to the present embodiment will be described.

Slider 50: thin and long femto type (1×0.7×0.2 mm$^3$)
FCAC 51: 1.8 nm
Read gap length $G_s$: 17 nm
Read element 12: TMR ($T_{rw}$=29 nm)
First recording pole 122: FeCoFe($T_{WW}$=60 nm), d=15 nm, θ=15°, β=15°
Second recording pole 124: FeCoNi
STO recording element 40: $Cu_{0.99}Au_{0.01}$(2 nm)/Rh(2 nm)/[$Co_{0.95}Pt_{0.05}$/$Ni_{0.95}Pt_{0.05}$](3 nm)/$Cu_{0.99}L_{0.01}$(2 nm)/[$Co_{0.85}Fe_{0.10}V_{0.05}$/$Fe_{0.85}Co_{0.10}Ru_{0.05}$](13 nm)/$Ti_{0.95}V_{0.05}$(4 nm)
FGL width: $W_{FGL}$=35 nm
Medium substrate: 3.5 inch NiP-plated Al alloy substrate
Medium structure: lubricating layer (1 nm)/C(2 nm)/CoCrPt—(SiTi)O$_2$B(4 nm)/CoCrPt—(SiTa)O$_2$(4 nm)/CoCrPt—SiO$_2$C(4 nm)/Ru(10 nm)/CoFeTaZr(10 nm)/Ru (0.5 nm)/CoFeTaZr(10 nm)

In the foregoing, the recording pole was of the main pole/auxiliary magnetic pole-type with the four-face narrowed structure shown in the FIGS. 13 and 14, and the STO recording element included a $Ti_{0.95}V_{0.05}$ underlayer, a [$Co_{0.85}Fe_{0.10}V_{0.05}$/$Fe_{0.85}Co_{0.10}Ru_{0.05}$] magnetic super-lattice FGL, a $Cu_{0.99}L_{0.01}$ intermediate layer, a [$Co_{0.95}Pt_{0.0}$/$Ni_{0.95}Pt_{0.05}$] magnetic super-lattice spin injection layer, Rh, and a $Cu_{0.99}Au_{0.01}$ layered cap layer. The added element L for the non-magnetic intermediate layer was V, Nb, Zr, Ru, Os, Pd, Rh, or Ir. On the magnetic head slider 50, the TFCs 02a and 02b of a NiCr thin film with the resistance of 80Ω were disposed as shown in FIG. 13 for clearance control purpose.

In the perpendicular magnetic recording medium, the magnetic anisotropy field Hk of the magnetic layer upper-most layer 133, the intermediate layer 139, and the lower-most layer 134 was 21 kOe, 16 kOe, and 18 kOe, respectively.

Effects of Present Embodiment

With respect to any of the added element L, the lattice constant matching between the [CoFeV/FeCoRu] and [CoPt/NiPt] magnetic super-lattices and the $Cu_{0.98}L_{0.01}$ non-magnetic intermediate layer was 1.0 to 1.5%. When the characteristics of the microwave assisted magnetic recording head and the perpendicular magnetic recording medium were evaluated on the magnetic read/write characteristics evaluation equipment, the S/N was improved by about 1.5 dB when the above additive was added compared with when Cu was used for the non-magnetic intermediate layer of the magnetic head according to conventional technology, thus indicating a good microwave assist effect as in the second embodiment.

Further, when the magnetic head was subjected to a high-temperature/high-humidity test with the humidity 90% and temperature 80° C. to evaluate its corrosion resistance for one day, no S/N degradation was observed during recording in the case of the magnetic head according to the present invention, as in the first embodiment. Further, it has been confirmed that an about 20% improvement in spin injection efficiency can be obtained with the magnetic head according to the present embodiment, as in the second embodiment, over a comparative example using Cu for the underlayer and the intermediate layer according to conventional technology.

Sixth Embodiment

According to the present embodiment, the STO was used as a read sensor. Specifically, the microwave assisted magnetic recording head was formed in the same way as the fifth embodiment (FIG. 13) with the exception that the STO sensor element 12, of which a schematic cross sectional view is shown in FIG. 15, was built in the read head portion 12 of the microwave assisted magnetic head shown in FIG. 13.

(STO Sensor)

Figure 15:
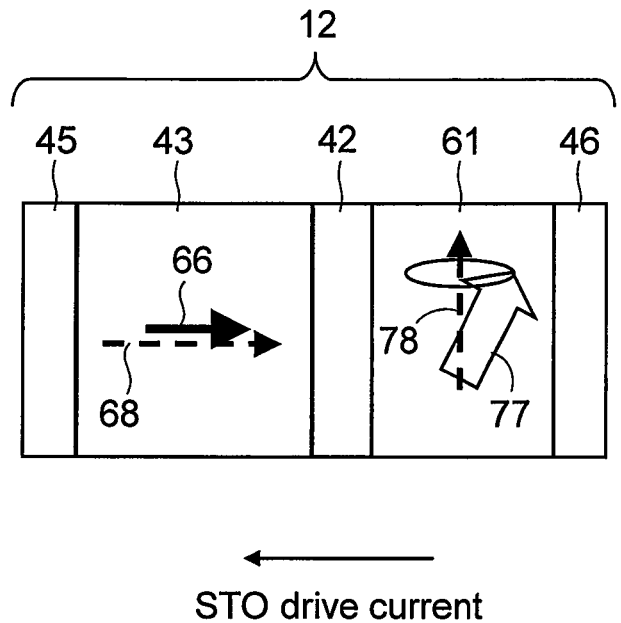
FIG. 15 is a schematic cross sectional view of an STO-type magnetic sensor.

The STO sensor according to the present embodiment shown in FIG. 15 includes the non-magnetic alloy intermediate layer 42, a magnetization rotation layer 61, and the spin injection layer 43 for providing a spin torque to a magnetization 77 of the rotation layer. An arrow 66 indicates the perpendicularly orientated magnetization in the spin injection layer 43. The arrow 77 indicates the magnetization that rotates about the longitudinal rotation axis in the magnetization rotation layer 61. For the underlayer 45 and the cap layer 46, a Cu alloy, an Ag alloy, an Au alloy, or the like having a long spin scattering length and excellent corrosion resistance and electromigration-resistant characteristics was used, as in the first embodiment.

In the STO sensor for reading, as opposed to the high frequency oscillating element for recording, the magnetization of the magnetization rotation layer 61 was caused to rotate at high speed (high frequency oscillation) such that it has parallel and antiparallel components with respect to the magnetization 66 of the spin injection layer, so that the magneto-resistance change ratio during magnetization rotation can be maximized to provide a large read output. Recording information is detected by utilizing a change in the rotation frequency caused by the leakage magnetic field from the magnetization information recorded in the magnetic recording medium. Thus, in the STO sensor, compared with the conventional TMR, CPP-GMR sensor, and the like, the magnetic anisotropy energy of the magnetic film can be increased, so that the thermal fluctuation noise (mag-noise) due to element miniaturization can be suppressed. Accordingly, a high read S/N on the order of 30 dB can be obtained even when the read track width is 20 nm or less.

According to the present embodiment, the magnetization rotation layer 61 is a longitudinal uni-axial magnetic anisotropy magnetic layer of a Heusler alloy such as $Co_2MnGe$ and $Co_2FeAl$, or a magnetic material such as CoNiFe, CoFe, CoFe/Ru/NiFe, and NiFe, with a magnetic easy axis 78 in the film plane of the magnetization rotation layer 61. As the magnetic material, it is preferable to use a Heusler alloy film having a high spin polarization rate with which a particularly high magneto-resistance change ratio can be obtained, such as $Co_2MnGe$ or $Co_2FeAl$. It is further preferable to optimize the magnetic anisotropy magnetic field and the direction of its magnetic easy axis as follows. Namely, it is preferable to obtain high read sensitivity by (1) disposing the magnetic easy axis 78 substantially perpendicular to the medium plane such that the magnetic field from the perpendicular magnetic recording medium can be applied in the magnetization rotation axis direction to maximize the detection sensitivity to a frequency change; or (2) disposing the magnetic easy axis 78 at an angle of the order of several to 60 degrees with respect to the medium plane to increase the permeability in the magnetic field direction, so that the leakage magnetic field from the magnetic recording medium can be efficiently drawn into the soft magnetic material magnetization rotation layer 61, thus increasing the magnetic flux utilization ratio. Further, by making the height of the high frequency magnetic field oscillating element greater than its width, formation of a magnetic flux closed magnetic circuit can be facilitated by the recording field from a deeper portion of the perpendicular magnetic recording medium and the element portion corresponding to the excess height, whereby the magnetic field component from the deeper portion of the perpendicular magnetic recording medium can be detected, thus resulting in a further increase in read sensitivity, which is particularly preferable. In order to ensure high frequency oscillation performance of the Heusler alloy, it is important to control the crystalline defect and the degree of ordering of the magnetic film, and, according to an analysis by the present inventors, it is particularly important to ensure the lattice matching with the non-magnetic intermediate layer.

Thus, as in the first embodiment, the non-magnetic alloy intermediate layer 42 was made of a non-magnetic alloy containing at least 50 at % or more of at least one element selected from the first group consisting of Cu, Ag, and Au, and at least 0.1 at % or more in total and not more than 25 at % independently of at least one element selected from the second group that does not overlap with the first group element, and the lattice constant mismatch with the magnetic layer of a Heusler alloy or the like was set to be not more than 4% and more desirably not more than 1.5%, in order to control the lattice strain and magnetic anisotropy of the magnetic film.

As the spin injection layer 43, a hard magnetic material having perpendicular magnetic anisotropy was used to stabilize the oscillation of the magnetization rotation layer 61. Namely, as in the first embodiment, a magnetic super-lattice thin film such as [Co/Pt], [Co/Ni], [Co/Pd], or [CoCrTa/Pd], or a perpendicular magnetic film such as CoCrPt was used. Preferably, the magnetic thin film is a magnetic super-lattice thin film of a stack of at least two layers of a magnetic alloy thin film containing at least 50% or more of Co and at least 0.1 at % or more in total and not more than 25 at % independently of at least one element selected from the second additive group, and a magnetic alloy thin film containing at least 50 at % or more of at least one element selected from the group consisting of Fe and Ni, and at least 0.1 at % or more in total and not more than 25 at % independently of at least one element selected from the second additive group, as described with reference to FIGS. 5 and 7 for the first embodiment. The order of stacking of the spin injection layer 43 and the FGL 41 may be reversed. The recording pole may have the ring type structure shown in FIG. 2.

(Perpendicular Magnetic Recording Medium)

The perpendicular magnetic recording medium 130 had three magnetic layers 133, 139, and 134. The magnetic anisotropy field Hk of the upper-most layer where the microwave assist effect acts most strongly was increased, and the constituent elements, film thickness, and the like of the magnetic film were adjusted such that sufficient recording cannot be performed with the recording field from the recording pole and can be performed only when the STO 40 is simultaneously operated.

The configuration and specifications of the microwave assisted magnetic recording head and the perpendicular magnetic recording medium according to the present embodiment will be described below.

Slider 50: thin and long femto type ($1 \times 0.7 \times 0.2$ mm$^3$)
FCAC 51: 1.8 nm
Read track width $T_{rw}$: 28 nm
Read gap length $G_s$: 14 nm
STO sensor element 12: $Cu_{0.95}Ni_{0.05}$(1.5 nm)/$Co_2Mn(Ga_{0.5}Ge_{0.5})$(4 nm)/$Cu_{1-a-b}Au_aR_b$(2 nm)/MgO(1 nm)/[$Co_{1-x-y}Pt_xQ_y$/$Ni_{0.8}Fe_{0.15}Ru_{0.05}$](4 nm)/$Cu_{0.85}Nb_{0.15}$(1.5 nm)($T_{rw}$=30 nm, element height=40 nm)

First recording pole 122: FeCoFe($T_{WW}$=60 nm), d=15 nm, θ=15°
Second recording pole 124: FeCoNi
STO recording element 40: $Cu_{0.98}Ni_{0.02}$(2 nm)/Ru(2 nm)/[$Co_{0.99}Ir_{0.01}$/$Fe_{0.99}Zr_{0.01}$](13 nm)/$Cu_{0.99}Au_{0.01}$(2 nm)/[$Co_{0.96}Pt_{0.03}Cr_{0.01}Ni_{0.98}Nb_{0.02}$](3 nm)/$Cr_{0.9}Pt_{0.1}$(4 nm)
FGL width: $W_{FGL}$=34 nm
Medium substrate: 3.5 inch NiP-plated Al alloy substrate
Medium structure: lubricating layer (1 nm)/C(2 nm)/CoCrPt—(SiTi)O$_2$B(4 nm)/CoCrPt—(SiTa)O$_2$(4 nm)/CoCrPt—SiO$_2$C(4 nm)/Ru(10 nm)/CoFeTaZr(10 nm)/Ru (0.5 nm)/CoFeTaZr(10 nm)

The STO sensor 12 included the underlayer of $Cu_{0.85}Nb_{0.15}$, the spin injection layer of a [$Co_{1-x-y}Pt_xQ_y$/$Ni_{0.8}Fe_{0.19}Ru_{0.01}$] magnetic super-lattice, the tunnel barrier layer of an MgO thin film, the non-magnetic intermediate layer of $Cu_{1-a-b}Au_aR_b$, the magnetization rotation layer of a Heusler alloy $Co_2Mn(Ga_{0.5}Ge_{0.5})$, and the cap layer of $Cu_{0.95}Ni_{0.05}$.

The added element Q in the magnetic layer was V, Nb, Cr, Ru, Pt, or Rh. The composition x was 0.1 and 0.15, and the composition y was 0.01 and 0.02. The composition a of the added element Au in the non-magnetic intermediate layer was 0.1 and 0.15, the composition b of the added element R was 0.01 and 0.02, and the STO sensor width (read track width) $T_{rw}$ was 15 nm. The tunnel barrier layer may be GaO instead of MgO, or the order of stacking of $Cu_{1-a-b}Au_aR_b$ and the tunnel barrier layer may be changed. On the magnetic head slider 50, the TFCs 02a and 02b comprising a NiCr thin film with the resistance 80Ω were disposed for clearance control purpose, as shown in FIG. 13.

In the perpendicular magnetic recording medium, the magnetic anisotropy field Hk of the magnetic layer upper-most layer 133, the intermediate layer 139, and the lower-most layer 134 was 20 kOe, 19 kOe, and 18 kOe, respectively.

Effects of Present Embodiment

With respect to the added element Q, its composition y, the composition x of Pt, the added element R, its composition b, and the composition a of Au, the lattice constant matching between the [$Co_{1-x-y}Pt_xQ_y$/$Ni_{0.8}Fe_{0.19}Ru_{0.01}$] magnetic super-lattice, the non-magnetic intermediate layer of $Cu_{1-a-b}Au_aR_b$, and the Heusler alloy $CO_2Mn(Ga_{0.5}Ge_{0.5})$ was 1 to 3.5%, and was particularly good at 1 to 2% when the combination of compositions (a, x) was (0.02, 0.02).

The characteristics of the perpendicular magnetic recording medium were evaluated by using the microwave assisted magnetic recording head provided with the STO sensor having the Heusler alloy on the magnetic read/write characteristics evaluation equipment. A read waveform from the STO sensor whose oscillation frequency is modulated in accordance with the magnetic field from the recording magnetization of the perpendicular magnetic recording medium was multiplied by the read waveform delayed by one bit, and the product was processed by a low-pass filter. As a result, the magnetization information from the perpendicular magnetic recording medium was read at high resolution with a very high S/N of 30 dB when the additive was added, which was higher by 3 dB than when Cu was used for the non-magnetic intermediate layer according to conventional technology, even when the track width $T_{rw}$ was 15 nm.

Further, compared with when the TMR sensor with the read gap length $G_s$ of 17 nm according to conventional technology was used for the read element, as described with reference to the fifth embodiment, the recording signal resolution and the signal quality (S/N) at the time of reading were improved when the STO sensor element with the $G_s$ of 14 nm was used for the read element, and an approximately 10% higher recording density was realized.

When the magnetic head was subjected to a high-temperature/high-humidity test with the humidity 95% and the temperature 60° C. to evaluate its corrosion resistance for two days, no S/N degradation during microwave assisted recording, and particularly no output degradation during reading were observed with the magnetic head according to the present invention, as in the first embodiment. Further, it has also been confirmed during an accelerated electric current energization reliability test of the STO sensor at 60° C. and $10^9$ A/cm$^2$ that there is absolutely no degradation in read output, indicating high reliability.

The same result was obtained when GaO was used for the STO sensor element 12 instead of MgO. By providing a spin interface state control layer of CoFeB, Co, NiFe, or the like at the interface with the intermediate layer, the magneto-resistance effect was improved by approximately 5% and also the sense current could be decreased by approximately 5%. Thus, the energization life margin against element dimension variations was extended.

While the best result was also obtained when all of the alloy underlayer, the alloy cap layer, the alloy intermediate layer, and the alloyed magnetic layer were used in combination in the case of using the STO for a sensor, the effect was most pronounced when only the alloy intermediate layer was used, followed by the alloying effect of the alloy magnetic layer, the alloy underlayer, and the alloy cap layer. Even when any one of these layers was alloyed, an improvement of the order of 0.5 to 1 dB was obtained compared with when there was no alloying.

Seventh Embodiment

According to the present embodiment, the STO sensor element having a longitudinal uni-axial magnetic anisotropy magnetic thin film for the spin injection layer and using the non-magnetic intermediate layer and the magnetization rotation layer with the same configuration as that of the STO of the first embodiment will be described. An embodiment of the read head structure suitable for the STO sensor will also be described.
(STO Sensor)

Figure 16:
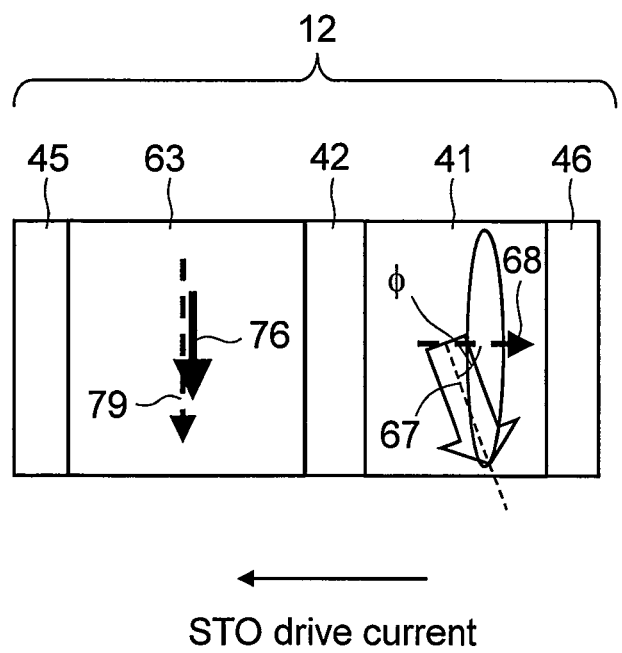
FIG. 16 is a schematic cross sectional view of the STO-type magnetic sensor.

In the STO sensor according to the present embodiment, of which a schematic cross sectional view is shown in FIG. 16, compared with the STO sensor according to the sixth embodiment shown in FIG. 15, the perpendicular and longitudinal magnetization arrangements of the spin injection layer and the rotation magnetization layer are modified, the magnetization 76 of the spin injection layer 63 is oriented longitudinally, and the magnetization 67 of the magnetization rotation layer 41 is caused to rotate about the rotation axis (magnetic easy axis) 68 perpendicular to the film plane.

As the magnetization rotation layer 41, a thin film of $Co_{0.6}Fe_{0.4}$, $Co_{0.99}Fe_{0.01}$, or $Co_{0.8}Ir_{0.2}$, or a Co-based magnetic super-lattice such as [Co/Fe], which has negative perpendicular magnetic anisotropy is used. In this configuration, the magnetic easy axis 68 is perpendicularly orientated with respect to the film plane and has the magnetic easy plane in the film plane. Thus, the magnetization 67 rotates at high speed about the magnetic easy axis 68 as a rotation axis in response to the spin injection and spin torque from the spin injection layer 63.

An analysis by the present inventors has indicated the features that, although the spin polarization rate may be inferior to that of the Heusler alloy according to the sixth embodiment, in the [Co or Co-based alloy/Fe or Fe-based alloy] magnetic super-lattice having negative perpendicular magnetic anisotropy, a magnetic domain structure is not readily formed compared with the Heusler alloy and the like, the oscillation state of the magnetization with respect to the external magnetic field is stable, and the linear response property of the high frequency oscillation frequency change in response to the external magnetic field magnetization is particularly good as the rotation layer 41. As the CO thin film or the Co-based alloy thin film, and the Fe thin film or the Fe-based alloy magnetic alloy thin film, it is preferable to use a magnetic super-lattice thin film of at least two stacked layers each of the magnetic thin film (1) and the magnetic thin film (2) below:

(1) A CoFe alloy thin film of Co to which at least 0.1 at % or more and 20 at % or less of Fe is added, or a magnetic alloy thin film containing at least 50% or more of the CoFe alloy and at least 0.1 at % or more in total and not more than 25 at % independently of at least one element selected from the second group except for Cu.

(2) An FeCo alloy thin film of Fe to which at least 0.1 at % or more and 70 at % or less of Co is added, or a magnetic alloy thin film containing at least 50 at % or more of the FeCo alloy and at least 0.1 at % or more in total and not more than 25 at % independently of at least one element selected from the second group except for Cu.

This is due to the following reason. Namely, as the STO read element, it is preferable to increase the magnetic resistance change and read, output during magnetization rotation of the magnetization rotation layer 41. In the foregoing, by using the [CoFe alloy/FeCo alloy] magnetic super-lattice thin film having the CoFe alloy thin film of Co to which at least 0.1 at % or more and 20 at % or less of Fe is added, and the FeCo alloy thin film of Fe to which at least 0.1 at % or more and 70 at % or less of Co is added, the magneto-resistance effect and read output can be increased by the order of 1 to 20% compared with the [Co/Fe] magnetic super-lattice thin film. For example, the [CoFe alloy/FeCo alloy] magnetic super-lattice thin films of two to 25 layers each of $Co_{0.9}Fe_{0.1}$ and $Fe_{0.9}Co_{0.1}$ alloys each measuring 0.2 nm, 0.4 nm, 0.5 nm, 0.6 nm, and 0.8 nm were formed on a glass substrate, using $Cu_{0.99}Au_{0.01}$ with the film thickness of 2 nm and $Cr_{0.99}Ti_{0.01}$ with the film thickness of 2 nm as underlayer films, and further $Co_{0.9}Fe_{0.1}$ (2 nm)/Ru(4 nm)/$Ni_{0.8}Fe_{0.2}$ (2 nm) was formed thereon via $Cu_{0.99}Ag_{0.01}$ (2 nm)/MgO (1 nm), and their magneto-resistance effect was evaluated. As a result, it has been confirmed that, in all of the samples, the magneto-resistance effect could be improved by 10 to 20% based on a change in the electronic structure of the magnetic layer by alloying, compared with a [Co/Fe] magnetic super-lattice thin film formed with a similar configuration.

Further, when at least 0.1 at % or more in total and not more than 25 at % independently of at least one element selected from the second group except for Cu was added to the CoFe alloy and the FeCo alloy, although the specific resistance was increased, high energization life was obtained as described with reference to the first embodiment, and the sense current for energization could be increased by 15% or more when any of the non-magnetic elements was added, and the read output was increased by 5 to 10% as a whole. Further, as described with reference to the first embodiment, by adding the non-magnetic element from the second group except for Cu, high corrosion resistance causing no practical problem can be obtained. Thus, it has been confirmed that by the configuration according to the present embodiment, a magnetic superlattice thin film for the STO sensor having excellent overall characteristics including reliability can be obtained. When a spin interface state control layer of CoFeB, Co, NiFe, or the like was provided at the interface with the intermediate layer, even higher magneto-resistance effect and read output were obtained, which was further preferable.

As the spin injection layer 63, it is preferable to use a longitudinal uni-axial magnetic anisotropy soft magnetic thin film of CoFe, NiFe, or the like, and it is particularly preferable to use a laminated film of at least one layer of a Co-based magnetic film of CoFe/Ru/NiFe, CoFe/CuAu/CoFe, or the like anti-ferromagnetically coupled with another magnetic layer, in order to ensure stability with respect to the external magnetic field. The order of stacking of the spin injection layer 43, the magnetization rotation layer 41, the non-magnetic underlayer 45, and the cap layer 46 may be reversed.

In the above magnetic layer, the lattice strain, long spin scattering length, corrosion resistance, electromigration-resistant characteristics, magnetic anisotropy, and the like can be controlled by the non-magnetic alloy intermediate layer 42 including at least one alloy layer containing at least 50 at % or more of at least one element selected from the first group consisting of Cu, Ag, and Au and having a lattice constant mismatch (lattice mismatch) with the magnetic layer of not more than 4% and more desirably not more than 1.5%, as described in the first embodiment, whereby high spin injection efficiency and high read output can be obtained. For the non-magnetic underlayer 45 and the cap layer 46, it is preferable to use a Cu alloy, an Ag alloy, an Au alloy, and the like, as in the first embodiment.

(Read Head)

Next, with reference to FIG. 17, the structure of a draw-in type read head in which the STO sensor element 12 is disposed in a rear part of the read head 10 (in a far side in the element height direction) will be described.

In the STO sensor, the spin injection layer 63 of a longitudinal uni-axial magnetic anisotropy magnetic thin film, such as CoFe/Ru/NiFe, has high permeability and small magnetic resistance. Further, by increasing the cross section area of the rear part of the read head 10 and the area of the STO sensor element compared with the read head structure shown in FIG. 2, the magnetic resistance can be further decreased, and the efficiency of detection of leakage magnetic flux from the medium, namely, read sensitivity, can be increased. It was also possible to further increase permeability by 30% or more by using multilayer films for the spin injection layer and the upper and lower shield layers, in which case the read output was preferably increased by approximately 10%.

Figure 17:
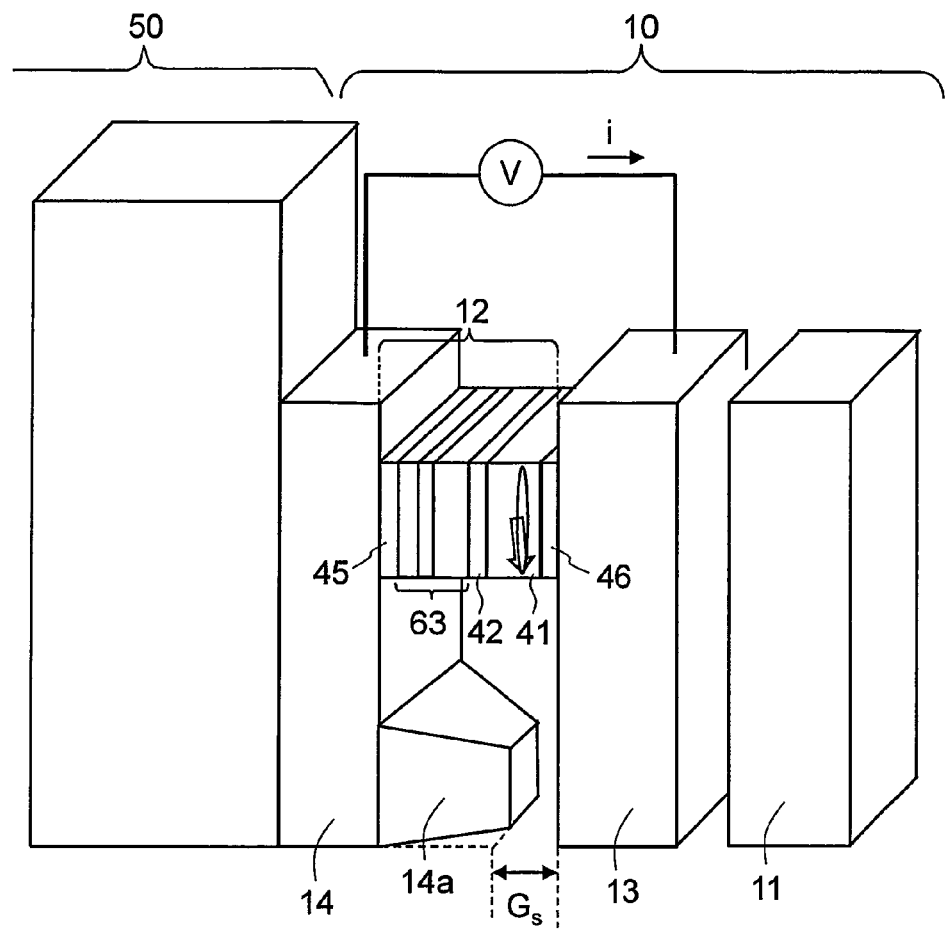
FIG. 17 is a conceptual diagram of a draw-in type read head equipped with the STO-type magnetic sensor.

Thus, also by disposing the STO sensor element in the rear part of the read head, as in the read head of the present structure shown in FIG. 17, the magnetic field from the medium can be efficiency focused in the rotation axis direction of the magnetization rotation layer, and the magnetic flux from the medium, namely, the recording magnetization state, can be highly sensitively detected on the basis of a change in the oscillation frequency.

In the read head structure described with reference to the first embodiment (FIG. 2) and the ninth embodiment (FIG. 13), it is difficult to make the total film thickness of the read element 12 smaller than 10 nm, so that the read gap length $G_s$ cannot be made smaller than 10 nm. However, by installing the read sensor at a separate location from the magnetic gap as in the present structure, the read gap length $G_s$ can be decreased to 1 nm while the film thickness of the read sensor on the order of 10 nm which is necessary to ensure magnetic characteristics, electromigration-resistant reliability, and the like, are ensured. Thus, the medium magnetization state recorded with small bit lengths can be read with high resolution, which is particularly suitable as a read head adapted for high recording densities. It is preferable, however, to set $G_s$ at not more than 25 nm as sensitivity may be decreased by too much $G_s$ due to gap loss.

(Magnetic Recording Medium)

In the perpendicular magnetic recording medium 30 shown in FIG. 2, the magnetic anisotropy field Hk of the upper-most side magnetic layer 33 was increased, and the constituent elements, film thickness, and the like of the magnetic film were adjusted so that sufficient recording cannot be performed with the recording field from the recording pole 22 and can be performed only when the STO 40 is simultaneously operated. The magnetic anisotropy field Hk of the magnetic layers 33 and 34 was 18 kOe and 17 kOe, respectively.

The configuration of the magnetic head and the perpendicular magnetic recording medium according to the present embodiment is shown below.

Slider 50: thin and long femto type (1×0.7×0.2 mm)
Head protection film (FCAC): 1.8 nm
Read track width $T_{rw}$: 28 nm
Read gap length $G_s$: 10 nm
STO sensor element 12: $Ag_{0.99}Au_{0.01}$(1 nm)/[$(Co_{0.8}Fe_{0.2})_{1-a}A_a$/$(Fe_{0.9}Co_{0.1})_{1-b}B_b$](3 nm)/$Cu_{1-x-y}Ag_xQ_y$(2 nm)/MgO(1 nm)/$Co_{0.9}Fe_{0.1}Rh_{0.02}$(2 nm)/Ru(4 nm)/$Ni_{0.8}Fe_{0.2}Ta_{0.02}$(2 nm)/$Cu_{0.98}Au_{0.02}$(2 nm)
First recording pole 22: FeCoNi($T_{WW}$=60 nm)
Second recording pole 24: FeCoNi
STO recording element: $Ag_{0.99}Ni_{0.01}$(5 nm)/$Ta_{0.99}Mo_{0.99}$(5 nm)/[$Co_{0.75}Fe_{0.25}$/$Fe_{0.99}Pt_{0.01}$](8 nm)/$Cu_{1-x-y}Ag_xL_y$(2 nm)/[$Co_{0.9}Pt_{0.1}Ni_{0.8}Fe_{0.2}$](7 nm)/$Ru_{0.9}Cr_{0.1}$ (10 nm)
FGL width: $W_{FGL}$=34 nm
Medium substrate: 3.5 inch NiP-plated Al alloy substrate
Medium structure: lubricating film (1 nm)/C(2 nm)/CoCrPt—(SiTi)$O_2$(2 nm)/CoCrPt—Si$O_2$C(10 nm)/Ru(10 nm)/CoFeTaZr(10 nm)/Ru(0.5 nm)/CoFeTaZr(10 nm)

In the foregoing, the STO sensor included the $Cu_{0.98}Au_{0.02}$ underlayer, the $Co_{0.9}Fe_{0.01}Rh_{0.02}$/Ru/$Ni_{0.8}Fe_{0.2}Ta_{0.02}$ laminated spin injection layer, the MgO tunnel barrier layer, the $Cu_{1-x-y}Ag_xQ_y$ intermediate layer, the [$(Co_{0.8}Fe_{0.2})_{1-a}A_a$/$(Fe_{0.9}Co_{0.1})_{1-b}B_b$] magnetization rotation layer, and the $Ag_{0.99}Au_{0.01}$ cap layer. The added elements A, B, and Q were Au, Pt, Rh, V, or Ta, the composition x was 0.05 and 0.1, the compositions a, b, and y were 0.01 and 0.02, and the STO sensor width (read track width) $T_{rw}$ was 15 nm.

Effects of Present Embodiment

With respect to any of the added elements and compositions, the lattice constant matching between the $Co_{0.88}Fe_{0.1}Rh_{0.02}$/Ru/$Ni_{0.8}Fe_{0.18}Ta_{0.02}$ layered spin injection layer, the $Cu_{1-x-y}Ag_xQ_y$ intermediate layer, and the [$(Co_{0.8}Fe_{0.2})_{1-a}A_a$/$(Fe_{0.9}Co_{0.1})_{1-b}B_b$] magnetization rotation layer was 1 to 1.5% and particularly good.

As in the sixth embodiment, by processing the read waveform from the STO sensor, the magnetization information from the perpendicular magnetic recording medium could be read with high resolution with a very high S/N of 30 dB even when the read track width $T_{rw}$ was 15 nm. Compared with when Ag and Cu were used for the non-magnetic intermediate layer according to conventional technology, the S/N was increased by 3 dB and 1.5 dB, respectively, when the above additive was added.

Particularly in the read head according to the present embodiment (FIG. 17), the magnetization of the high frequency oscillation layer was easily caused to greatly rotate in the film plane ($\phi$ to 90°) and $G_s$ was decreased, so that the read resolution was further increased by 5 points and S/N was increased by 2 dB compared with the sixth embodiment (FIG. 15), thus indicating particularly excellent read characteristics.

When the magnetic head was subjected to a high-temperature/high-humidity test with the humidity 95% and the temperature 60° C. to evaluate its corrosion resistance for two days, as in the first embodiment, no S/N degradation during microwave assisted recording and particularly no output degradation during reading were observed in the magnetic head according to the present invention. As in the sixth embodiment, no degradation in read output, resistance value, and the like was observed during an accelerated electric current energization reliability test of the STO sensor at 60° C. and $10^9$ A/cm$^2$, thus indicating high reliability.

Eight Embodiment

An embodiment of a magnetic storage apparatus equipped with the microwave assisted magnetic recording head according to the first to seventh embodiments will be described with reference to FIG. 18.
(Magnetic Storage Apparatus)

Figure 18:
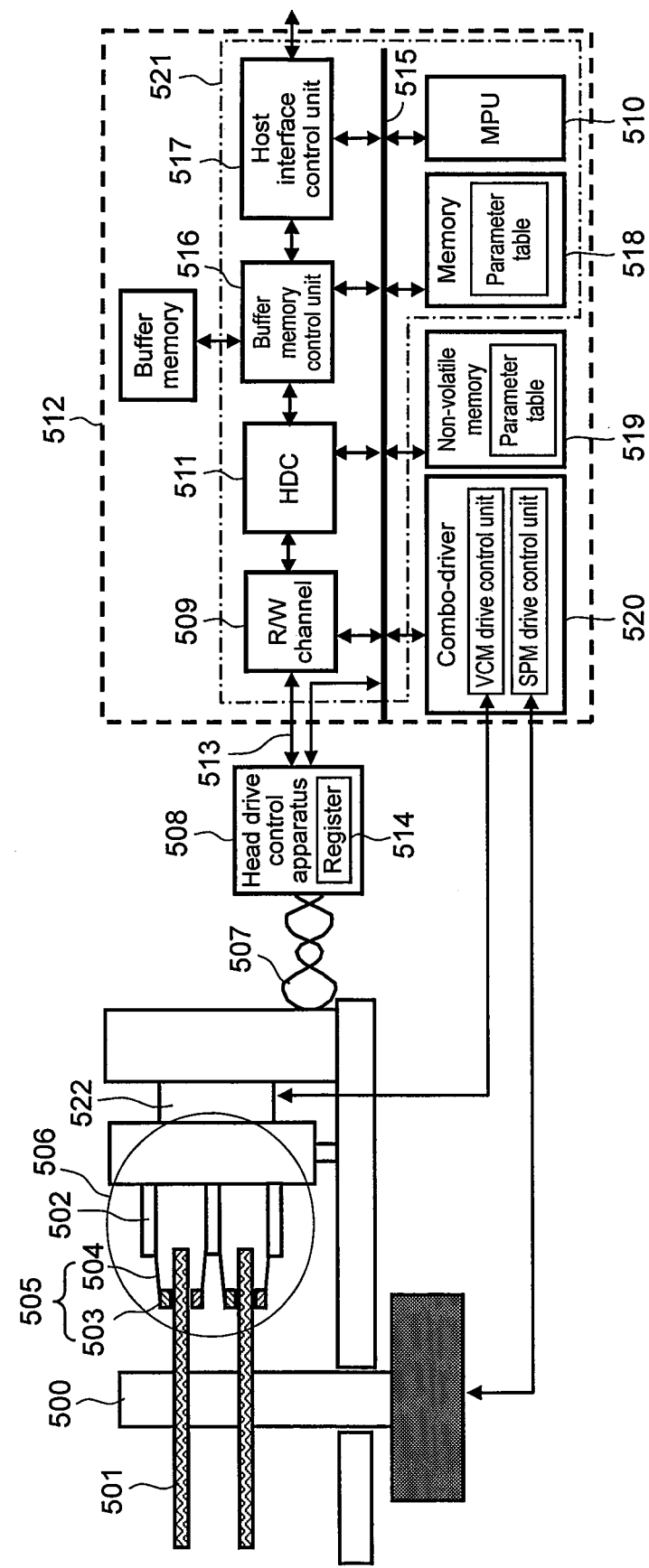
FIG. 18 is a conceptual diagram illustrating a configuration example of a magnetic storage apparatus.

The magnetic storage apparatus shown in FIG. 18 includes a spindle motor 500; a perpendicular magnetic recording medium 501; a high-rigidity arm 502; an HGA (which may be hereafter referred to simply as "magnetic head") 505; an HAS (Head Stack Assembly) 506; a head drive control device (R/W-IC) 508; a R/W channel 509; a microprocessor (MPU) 510; a disk controller (HDC) 511; a buffer memory control unit 516 for controlling a buffer memory; a host interface control unit 517; a memory unit 518 using RAM or the like for storing a control program and control data (parameter table); a non-volatile memory unit 519 using a flash memory, an FROM, or the like for storing the control program and control data (parameter table); a combo driver 520 including a VCM (Voice Coil Motor) drive control unit, a SPM (Spindle Motor) drive control unit, and the like; and an MPU bus 515.

The HGA 505 is provided with sliders 503 including an STO, a recording read element, a TFC, and the like, and with a high-rigidity suspension 504. The head drive control device 508 has an STO drive control function for generating a drive signal (drive current or drive voltage signal) for driving the STO and includes a recording amplifier and a read pre-amplifier. The R/W channel 509 functions as a recording modulation unit, a signal processor for a RS (Reed Solomon) channel using the Reed-Solomon code, which is a type of forward error correction code, or a non-RS (Non Reed-Solomon) channel using the latest LDPC (low density parity check) code, and a read demodulation unit.

The HGA 505 is connected to the head drive control device 508 via a signal line, and selects one magnetic head via a head selector signal based on a recording instruction or a read instruction from a host as a higher-level device (not shown) to perform recording or reading. The R/W channel 509, the MPU 510, the HDC 511, the buffer memory control unit 516, the host interface control unit 517, and the memory 518 are configured as a single LSI (SoC: System on Chip) 521. The LSI 521 is mounted on a control board 512, together with the drive control units, the non-volatile memory, and the like. The high-rigidity suspension or the high-rigidity arm may be provided with a damper of a vibration absorbing/suppressing material for additional suppression of vibrations as needed.

Preferably, the high-rigidity suspension 504 or the slider 503 may be fitted with a position fine-adjustment mechanism (dual actuator or microstage actuator) including a piezoelectric element, an electromagnetic element, a thermally deformed element, or the like so as to enable high-speed and high-accuracy positioning at high track density.

The MPU 510 is a main control apparatus for the magnetic storage apparatus, and performs servo control and the like necessary for recording or read operations and positioning of the magnetic head. For example, the MPU sets parameters required for the operation of the head drive control device 508 in the register 514. In various registers, predetermined temperatures, clearance control values for each perpendicular magnetic recording medium region (corresponding to electric power values supplied to the TFC), STO drive current values, backup current values, bias recording current values supplied to a coil for magnetizing the recording pole to generate the recording field, their overshoot amounts, timings, time constants for environment changes, and the like are set independently and as required, as will be described below.

The R/W channel 509 is a signal process circuit that outputs a signal 513 encoding the recording information transferred from the disk controller 511 to the head drive control device 508 during information recording. During information reading, the R/W channel 509 outputs demodulated read information to the HDC 511 after a read signal outputted from the magnetic head 505 is amplified by the head drive control device 508.

The HDC 511 performs processes, such as read/write information transfer control, data format conversion, and ECC (Error Check and Correction), by outputting a write gate indicating the start (recording timing) of information recording for writing the recording data 513 on the perpendicular magnetic recording medium to the R/W channel 509, for example.

The head drive control device 508 is a drive integrated circuit that, in response to the input of the write gate, generates at least one type of recording signal (recording current) corresponding to the recording data 513 supplied from at least the R/W channel 509, and supplies the recording signal to the magnetic head together with an STO drive signal with controlled energization timing. The head drive control device 508 includes, at least, a head drive circuit, a head drive current supply circuit, an STO delay circuit, an STO drive current supply circuit, and an STO drive circuit, and has registers in which a recording current value, an STO drive current value, a TFC supplied electric power value, operation timing, and the like are set from the MPU. The respective register values may be changed depending on conditions such as the region of the perpendicular magnetic recording medium, environment temperature, atmospheric pressure, and the like. Further, preferably, the head drive control device 508 may be provided with the function of supplying a bias recording current to the magnetic head and further starting a recording operation in accordance with the timing of the write gate outputted from the HDC, in response to a direct instruction from the MPU, forms an interface with the host system and which, as a main control device for the magnetic storage apparatus, implements a read/write operation (such as transfer of recording or read data) control or magnetic head positioning servo control. In this way, the operation timings for the means for supplying the bias recording current or the recording signal in response to the MPU indicating the operation of the magnetic storage apparatus or to the input of the write gate indicating information recording, and for the STO drive control means, their current waveforms, current values, clearance control electric power, backup current to the recording pole, recording current, and the like can be freely set. A temperature sensor is installed in the HDA, for example.

According to the present embodiment, two magnetic recording media and four magnetic head sliders are used. However, a single magnetic head slider may be provided for a single magnetic recording medium, and the number of the magnetic recording medium or the magnetic head may be increased depending on the purpose.

(Method for Selecting the Magnetic Head)

In the magnetic head described with reference to the first to seventh embodiments, the recording pole width and the STO width are different, as shown in FIGS. 2, 13, and 14, and the material, predetermined parameters, and characteristics of the magnetic head and the perpendicular magnetic recording medium are set such that the recording is determined by the STO width. However, the parameters may not satisfy the specifications due to manufacturing process variations. Thus, the head was selected as follows. Namely, first, the same servo information as in the magnetic storage apparatus was recorded in a predetermined zone and region of the perpendicular magnetic recording medium by using the microwave assisted magnetic recording head having the clearance of 1.5 nm. Then, by using the servo information, the read/write characteristics of the magnetic head were evaluated with the clearance during recording and reading set at 1.5 nm and 1 nm, respectively, and selection was made as follows.

Figure 19:
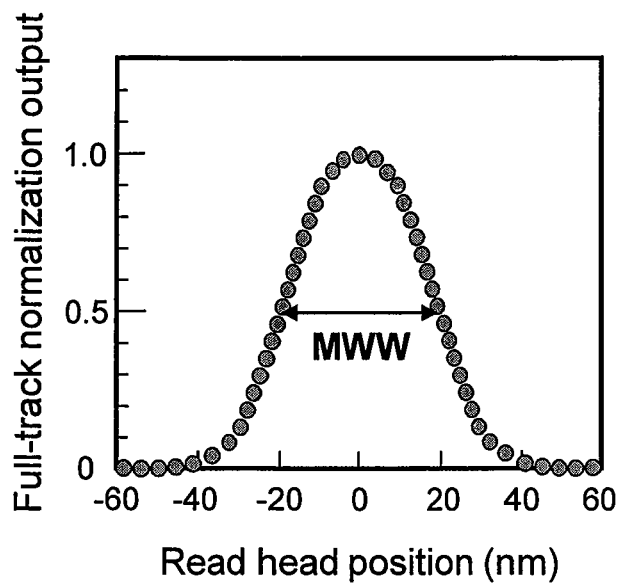
FIG. 19 illustrates an example of the result of MWW evaluation.
Figure 20:
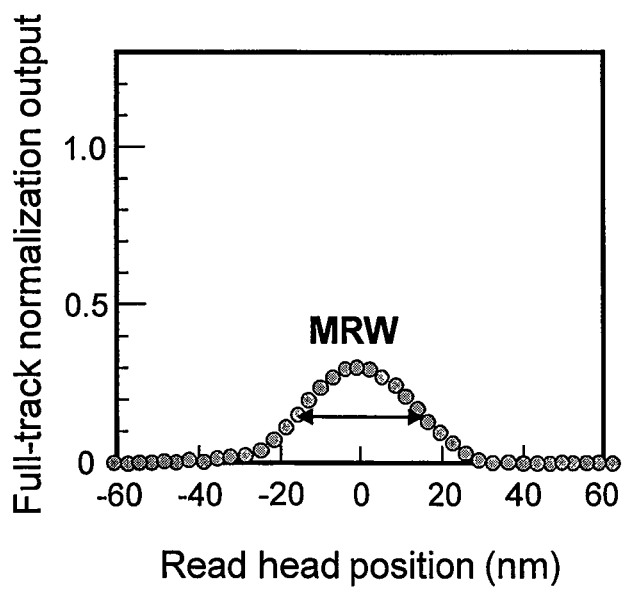
FIG. 20 illustrates an example of the result of MRW evaluation.

First, optimum values $P_{TFC}(0, 1)$, $I_{WB}(0, 1)$, and $I_{STO}(0, 1)$ of the TFC supplied electric power, bias recording current, and STO drive current, respectively, for the magnetic head $H_0$ and the zone $Z_1$ are stored in the registers of the head drive apparatus, the microwave assisted magnetic recording head is driven by using the data, a predetermined recording pattern is recorded in a predetermined frequency and recording track environment on a predetermined track in the zone $Z_1$ by using the servo information, and the following characteristics evaluation is performed on a sector by sector basis or for the complete track. As shown in FIG. 19, the recording track is recorded (full track) at approximately 10 to 20% of the highest frequency, and the recording track width MWW (0, 1) (Magnetic Write Width) is determined from the half-value width of the profile. Further, as shown in FIG. 20, the recording track recorded with the above frequency is erased from both sides partially, and a narrow-track (referred to as microtrack) such that the signal strength is 10 to 30% is created, and the magnetic read track width MRW (0, 1) (Magnetic Read Width) is determined from its half-value width.

Figure 21:
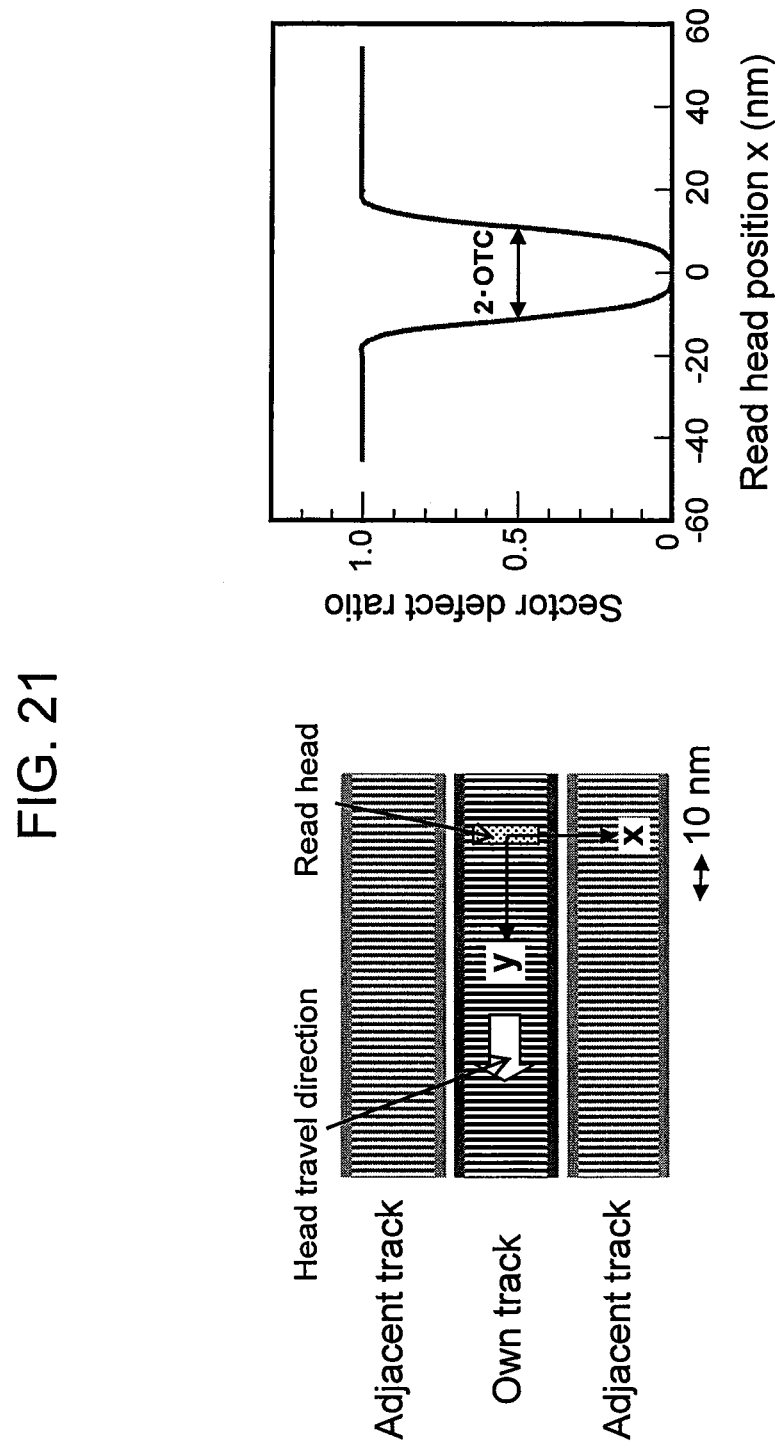
FIG. 21 illustrates an example of the result of evaluation of off-track characteristics (OTC).
Figure 22:
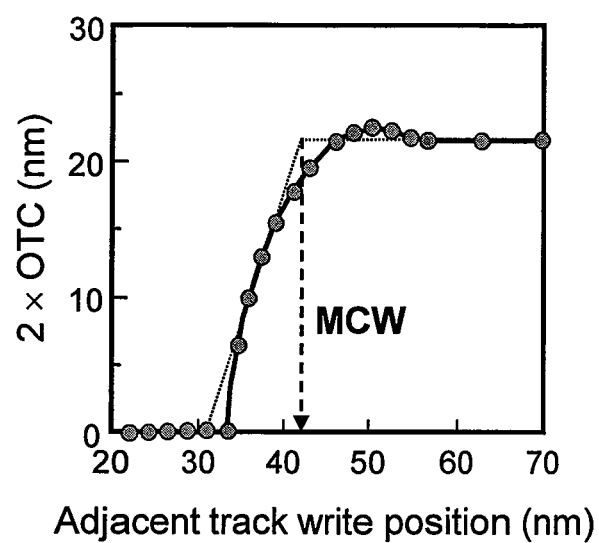
FIG. 22 illustrates an example of the result of evaluation of MCW (747 curve).

In the read/write characteristics evaluation apparatus according to the present invention, a non-RS channel using the LDPC code is used, and only the error rate after error correction can be measured. Generally, the probability of error or the error rate after error correction is extremely small (on the order of $10^{-9}$), and therefore the error rate cannot be accurately evaluated in a short period of evaluation such as during the selection test. Thus, as shown in FIG. 21, the off-track margin was evaluated as follows by using the sector defect rate at the time of adjacent track recording. Namely, with respect to the central recording track (own track), adjacent tracks on both sides are recorded with a predetermined linear recording density BPI while varying the amount of squeeze from one side, the sector defect rate after error correction is measured, the relationship between the sector defect rate and the track position, i.e., the so-called bathtub curve, is obtained, and the off-track resistance OTC (Off-track Capability) is evaluated from the bathtub curve width such that the sector defect rate is 50%. Then, as shown in FIG. 22, the adjacent squeeze interval dependency of the OTC is evaluated (747 curve evaluation), and the magnetic core width MCW (0, 1) (Magnetic Core Width) is determined by interpolating a limit adjacent track interval such that the off-track characteristics of the central recording track is not changed. As the evaluation method, the error rate may be evaluated intentionally under a condition such that an error is easily caused by limiting the error rate correction ability of the non-RS channel using the LDPC code.

Then, the adjacent track interference (ATI) characteristics are evaluated as needed, and the microwave assisted magnetic recording head such that recording with a good error rate is possible with the MWW of 39 nm, the MCW of 42 nm, and the MRW of 19 nm was selected.

(Method for Adjusting Magnetic Storage Apparatus)

Four of the microwave assisted magnetic recording heads that passed the selection test and two perpendicular magnetic recording media were built in a 2.5 inch-type or 3.5 inch-type HDA or a magnetic storage apparatus shown in FIG. 18, and predetermined servo information was recorded using a servo track writer or a self-servo write system.

In the servo information recording step, a servo track is formed with a specific track pitch in accordance with the track width of a specific magnetic head. However, in the magnetic storage apparatus, a plurality of magnetic heads with different recording track widths is mounted, as according to the present embodiment, and the track pitch does not necessarily correspond to optimum track pitches for the other magnetic heads with different recording track widths. Thus, during the manufacturing process for the magnetic storage apparatus, the squeeze characteristics of each magnetic head, the adjacent track interference ATI, the 747 characteristics, and the like are evaluated to determine the optimum data track pitch (track profile), a conversion formula from the servo track profile is determined, and a perpendicular magnetic recording medium data track profile is determined according to the conversion formula. This data track, in which recording or reading of user data is performed by the magnetic head positioned by using the servo information and the conversion formula, includes a plurality of data sectors for a preamble/servo portion, a 512 B or 4 kB data portion, a parity, ECC and CRC portions, and a data sector gap portion.

Finally, in a range such that a predetermined areal recording density is satisfied, margins are adjusted on a magnetic head or zone basis such that the error rate becomes substantially uniform in all of the zones for all of the magnetic heads, and the individual track densities and linear recording density profiles are determined (adaptive format) such that the magnetic storage apparatus as a whole can provide best performance, and the parameters are stored in the memory unit as needed, thus providing a magnetic storage apparatus having a predetermined capacity.

The values of the above parameters may preferably be subjected to temperature correction in accordance with the environment temperature as control values at normal temperature (30° C.) in the apparatus are registered as initial values.

(Control of Magnetic Storage Apparatus)

In the following, a control method for performing recording or reading in the magnetic storage apparatus using the above data will be described. In accordance with an instruction for recording or reading information from a host such as a personal computer or an upper-level system, the perpendicular magnetic recording medium 501 is rotated at a predetermined rotational speed by the spindle motor 500 under the control of the MPU 510, which is the main control device for the magnetic storage apparatus. Then, the magnetic head $H_k$ for performing the recording or reading of the predetermined information is loaded onto the magnetic recording medium, and a position on the medium is detected by using a read signal from the servo information of the perpendicular magnetic recording medium. Based on a position signal, a trajectory to a target position is calculated, the VCM 522 is controlled by the VCM drive control unit of the drive control unit 520, the high-rigidity HSA 506 and the magnetic head HGA 505 are moved (seek operation) onto a predetermined recording track in a predetermined zone $Z_p$ on the perpendicular magnetic recording medium at high speed and with high accuracy, and the magnetic head is caused to track (follow) the track position. Then, recording or reading of information is performed in a predetermined sector $S_j$ on the track in accordance with a firmware program of the MPU as follows.

First, during information recording, as the recording instruction from the host and the recording data are received by the host interface control unit 517, the recording instruction is decoded by the MPU 510, and the received recording data is stored in the buffer memory as needed. In the case of the RS channel, an ECC code is added after CRC (Cyclic Redundancy Check) addition and RLL code conversion (Run-Length Limited coding) in the HDC 511. Then, parity attachment, recording compensation (write pre-compensation), and the like are performed by a recording modulation system in the R/W channel 509, whereby recording data is obtained. In the case of the non-RS channel, after CRC attachment and RLL code conversion in the HDC, LDPC is attached in the R/W channel, and recording data is obtained after recording compensation and the like.

Then, a write gate indicating the start (recording timing) of data recording for writing the recording data 513 with the magnetic head $H_k$ (503) in the sector $S_j$ on the perpendicular magnetic recording medium is outputted from the HDC to the R/W channel 509, and, in response to the input of the write gate, a recording signal (recording current) corresponding to the recording data 513 supplied from the R/W channel 509 is generated. A drive signal is supplied to the recording head portion of the magnetic head $H_k$ via an FPC wire 507, together with an STO drive signal (drive current signal or drive voltage signal) with controlled energization timing, and recording is performed in the sector $S_j$ in the recording track in a predetermined zone on the perpendicular magnetic recording medium by the microwave assisted method. The optimum values of the magnetic head $H_k$, TFC supplied electric power, bias recording current, and the STO drive current in the zone $Z_p$ that were determined in the above process are saved from the memory unit to the registers of the head drive apparatus, and the microwave assisted recording head is driven by using the data.

At the time of reading information, upon reception of the read instruction by the host interface control unit 517 from the host, the read signal is read by the magnetic head $H_k$ (503) which is selected, positioned, and clearance-controlled for reading, as in the case of recording. The read signal is amplified by the R/W-IC and transmitted to the R/W channel 509, such as the RS channel using an RS code or the non-RS channel using an LDPC code. In the case of the RS channel, decoding by signal processing, parity decoding, and the like are performed, and then ECC error correction, RLL decoding, and confirmation of presence or absence of an error by CRC are performed in the HDC. On the other hand, in the case of the non-RS channel, an error is corrected by LDPC in the R/W channel, and RLL decoding and the confirmation of the presence or absence of an error by CRC are performed in HDC. Finally, these items of information are buffered in the buffer memory 521 and transferred from the host interface control unit 517 to the host as the read data.

Effects of Present Embodiment

In the magnetic storage apparatus according to the present embodiment, with respect to any of the magnetic heads and the magnetic recording media according to the first, second, fourth, and seventh embodiments with $W_{FGL}$ set to 34 to 36 nm, it has been confirmed that the apparatus can be operated with a high track density higher than 500 kTPI, or 1.05 MTPI, which has not been achieved by the conventional perpendicular magnetic recording technology. Further, when the magnetic storage apparatus according to the present embodiment was subjected to a high-temperature/high-humidity test at the humidity 95% and the temperature 50° C. to evaluate its reliability for two days, no degradation in error rate during recording or reading was observed in each case. It has also been confirmed through an accelerated electric current energization reliability test of the STO sensor at 60° C. and $10^9$ $A/cm^2$ that, as in the sixth embodiment, high reliability can be obtained.

Further, it has been confirmed that, by adjusting the read-write conditions as needed depending on the environment temperature, corrosion resistance, followability to environment temperature change, continuous read/write reliability, HDI reliability, and error rate can be ensured in a wide temperature range of between −5° C. and +65° C.

Ninth Embodiment

According to the present embodiment, a magnetic storage apparatus of the so-called shingled recording system in which, by using the microwave assisted magnetic recording head having a wide FGL, overlapping recording is performed at the pitches of substantially ½ to ⅓ the head.

(Magnetic Storage Apparatus and Method for Adjusting Same)

The microwave assisted magnetic recording head described with reference to the third embodiment with $W_{FGL}$ 50 nm, and a perpendicular magnetic recording medium in a degaussed state and having no servo information recorded were built in each of 2.5 inch-type and 3.5 inch-type magnetic storage apparatuses, a servo pattern was recorded by the shingled recording system with the track pitch $TP_{op}$ of 38 nm, and the magnetic storage apparatus of the shingled recording system was assembled and adjusted by the same method as according to the eighth embodiment.

Effects of Present Embodiment

By performing strong microwave assisted recording with a wide FGL according to the shingled recording system, compared with when the apparatus was configured with the same track pitch and $W_{FGL}$ of 36 nm, the error rate of the apparatus was improved by an order of magnitude, so that the yield of the apparatus was increased by approximately 10% for the same apparatus capacity.

In the present magnetic storage apparatus, it has been confirmed that, by adjusting the read-write conditions as needed depending on the environment temperature, corrosion resistance, followabily to environment temperature change, continuous read/write reliability, HDI reliability, and error rate can be ensured in a wide temperature range of from −5° C. to +65° C.

The present invention is not limited to the foregoing embodiments and may include various modifications. For example, the foregoing embodiments have been set forth to aid the description of the present invention in an easily understandable manner, and the present invention is not necessarily limited to have all of the described configurations. A part of the configuration of a certain embodiment may be substituted with the configuration of another embodiment, or the configuration of the other embodiment may be added to the configuration of the certain embodiment. A part of the configuration of each embodiment may be modified by addition, deletion, or substitution with another configuration.

REFERENCE SIGNS LIST

02 Thermally expandable element (TFC)
12 Sensor element
22 First recording pole
24 Second recording pole
26 STO oscillation control field
30 Magnetic recording medium
40 High frequency oscillating element portion (STO)
41 High frequency magnetic field generation layer (FGL)
43 Spin injection layer
47 High frequency magnetic field
50 Slider
100 Head travel direction
130 Magnetic recording medium

What is claimed is:

1. A microwave assisted magnetic recording head comprising:
a recording pole that generates a recording field for recording information in a perpendicular magnetic recording medium; and
a high frequency magnetic field oscillating element disposed adjacent to the recording pole,
wherein the high frequency magnetic field oscillating element includes an underlayer, a first magnetic layer disposed on the underlayer, a non-magnetic intermediate layer disposed on the first magnetic layer, and a second magnetic layer disposed on the non-magnetic intermediate layer;
wherein the non-magnetic intermediate layer is a non-magnetic alloy containing at least 50 at % of at least one kind of element selected from a first group consisting of Cu, Ag, and Au; and
wherein the non-magnetic intermediate layer contains at least 0.1 at % in total of at least one kind of element selected from a second group consisting of Cu, Ag, Au, Cr, Ti, Zr, Hf, V, Nb, Ta, Ru, Os, Pd, Pt, Rh, and Ir that does not overlap the element from the first group.

2. The microwave assisted magnetic recording head according to claim 1, wherein the non-magnetic intermediate layer contains at least two kinds of the element selected from the first group.

3. The microwave assisted magnetic recording head according to claim 1, wherein at least one of the first magnetic layer and the second magnetic layer is a Heusler alloy.

4. The microwave assisted magnetic recording head according to claim 1, wherein at least one of the first magnetic layer and the second magnetic layer is a magnetic superlattice thin film of at least two stacked layers of each of a magnetic thin film (a) and a magnetic thin film (b) below:
(a) a CoFe magnetic alloy thin film of Co to which between 0.1 at % and 20 at % of Fe is added, or a magnetic alloy thin film containing at least 50% of the CoFe magnetic alloy and at least 0.1 at % in total and not more than 25 at % independently of at least one kind of element selected from the second group except for Cu; and
(b) an FeCo magnetic alloy thin film of Fe to which between 0.1 at % and 70 at % of Co is added, or a magnetic alloy thin film containing at least 50 at % of the FeCo magnetic alloy and at least 0.1 at % in total and not more than 25 at % independently of at least one kind of element selected from the second group except for Cu.

5. The microwave assisted magnetic recording head according to claim 1, wherein the underlayer contains at least 50 at % of at least one kind of element selected from a second group consisting of Cu, Ag, Au, Cr, Ti, Zr, Hf, V, Nb, Ta, Ru, Os, Pd, Pt, Rh, and Ir, and at least 0.1 at % of at least one element that does not overlap therewith.

6. The microwave assisted magnetic recording head according to claim 1, comprising a cap layer contacting the second magnetic layer on the opposite side from the non-magnetic intermediate layer,
wherein the cap layer is a thin film containing at least 50 at % of at least one kind of element selected from the second group and at least 0.1 at % of at least one element that does not overlap therewith.

7. The microwave assisted magnetic recording head according to claim 1, wherein:
one of the first magnetic layer and the second magnetic layer is a spin injection layer having a magnetic anisotropy axis in a direction perpendicular to a film plane;
the other is a high frequency magnetic field generation layer having an effective magnetic easy plane in the film plane; and
electric current is caused to flow from the high frequency magnetic field generation layer toward the spin injection layer.

8. The microwave assisted magnetic recording head according to claim 1,
wherein the non-magnetic intermediate layer has a lattice constant mismatch with the adjacent first magnetic layer and second magnetic layer of not more than 4%.

9. The microwave assisted magnetic recording head according to claim 8, wherein the lattice constant mismatch is not more than 1.5%.

10. The microwave assisted magnetic recording head according to claim 8, wherein the underlayer and the first magnetic layer have a lattice constant mismatch of not more than 4%.

11. A microwave assisted magnetic recording/reproducing head comprising:
a recording head for recording information in a perpendicular magnetic recording medium; and
a read head having a magnetic read element disposed between a pair of magnetic shield layers,
wherein the magnetic read element includes an underlayer, a first magnetic layer disposed on the underlayer, a non-magnetic intermediate layer disposed on the first magnetic layer, and a second magnetic layer disposed on the non-magnetic intermediate layer;
wherein the non-magnetic intermediate layer is a non-magnetic alloy containing at least 50 at % of at least one kind of element selected from a first group consisting of Cu, Ag, and Au; and
wherein the non-magnetic intermediate layer is a non-magnetic alloy containing at least 0.1 at % of at least one kind of element selected from a second group consisting of Cu, Ag, Au, Cr, Ti, Zr, Hf, V, Nb, Ta, Ru, Os, Pd, Pt, Rh, and Ir that does not overlap with the element from the first group.

12. The microwave assisted magnetic recording/reproducing head according to claim 11, wherein the non-magnetic intermediate layer contains at least two kinds of the element selected from the first group.

13. The microwave assisted magnetic recording/reproducing head according to claim 11, wherein the non-magnetic intermediate layer has a lattice constant mismatch with the adjacent first magnetic layer and second magnetic layer of not more than 4%.

14. The microwave assisted magnetic recording/reproducing head according to claim 11, wherein at least one of the first magnetic layer and the second magnetic layer is a Heusler alloy or a magnetic super-lattice thin film of at least two stacked layers of each of a magnetic thin film (1) and a magnetic thin film (2) below:
  (1) a CoFe alloy thin film of Co to which between 0.1 at % and 20 at % of Fe is added, or a magnetic alloy thin film containing at least 50% of the CoFe alloy and at least 0.1 at % in total and not more than 25 at % independently of at least one kind of element selected from the second group except for Cu; and
  (2) an FeCo alloy thin film of Fe to which between 0.1 at % and 70 at % of Co is added, or a magnetic alloy thin film containing at least 50 at % of the FeCo alloy and at least 0.1 at % in total and not more than 25 at % independently of at least one kind of element selected from the second group except for Cu.

15. The microwave assisted magnetic recording/reproducing head according to claim 11, wherein the non-magnetic intermediate layer includes a tunnel barrier layer and a non-magnetic alloy layer.

16. The microwave assisted magnetic recording/reproducing head according to claim 14, wherein the magnetic read element is disposed in a far side in an element height direction of the pair of magnetic shield layers.

17. A magnetic storage apparatus comprising:
  a perpendicular magnetic recording medium;
  a medium drive unit that drives the perpendicular magnetic recording medium;
  a magnetic head that performs recording or reading of information on the perpendicular magnetic recording medium;
  a head drive unit that positions the magnetic head with respect to the perpendicular magnetic recording medium; and
  a processing unit that controls or processes an operation of the magnetic head,
  wherein the magnetic head includes a recording pole that generates a recording field, and a high frequency magnetic field oscillating element disposed adjacent to the recording pole;
  wherein the high frequency magnetic field oscillating element includes an underlayer, a first magnetic layer disposed on the underlayer, a non-magnetic intermediate layer disposed on the first magnetic layer, and a second magnetic layer disposed on the non-magnetic intermediate layer;
  wherein the non-magnetic intermediate layer is a non-magnetic alloy containing at least 50 at % of at least one kind of element selected from a first group consisting of Cu, Ag, and Au; and
  wherein the non-magnetic intermediate layer contains at least 0.1 at % in total of at least one kind of element selected from a second group consisting of Cu, Ag, Au, Cr, Ti, Zr, Hf, V, Nb, Ta, Ru, Os, Pd, Pt, Rh, and Ir that does not overlap the element from the first group.

18. The magnetic storage apparatus according to claim 17, wherein the underlayer contains at least 50 at % of at least one kind of element selected from a second group consisting of Cu, Ag, Au, Cr, Ti, Zr, Hf, V, Nb, Ta, Ru, Os, Pd, Pt, Rh, and Ir, and at least 0.1 at % of at least one kind of element that does not overlap therewith.

19. The magnetic storage apparatus according to claim 17, wherein the non-magnetic intermediate layer has a lattice constant mismatch with the adjacent first magnetic layer and second magnetic layer of not more than 4%.

20. The magnetic storage apparatus according to claim 17, wherein at least one of the first magnetic layer and the second magnetic layer is a Heusler alloy or a magnetic super-lattice thin film of at least two stacked layers of each of a magnetic thin film (1) and a magnetic thin film (2) below:
  (1) a CoFe alloy thin film of Co to which between 0.1 at % and 20 at % of Fe is added, or a magnetic alloy thin film containing at least 50% of the CoFe alloy and at least 0.1 at % in total and not more than 25 at % independently of at least one kind of element selected from the second group except for Cu; and
  (2) an FeCo alloy thin film of Fe to which between 0.1 at % and 70 at % of Co is added, or a magnetic alloy thin film containing at least 50 at % of the FeCo alloy and at least 0.1 at % in total and not more than 25 at % independently of at least one kind of element selected from the second group except for Cu.

21. The magnetic storage apparatus according to claim 17, wherein the underlayer contains at least 50 at % of at least one kind of element selected from a second group consisting of Cu, Ag, Au, Cr, Ti, Zr, Hf, V, Nb, Ta, Ru, Os, Pd, Pt, Rh, and Ir, and at least 0.1 at % of at least one element that does not overlap therewith.

* * * * *